United States Patent
Lee et al.

(10) Patent No.: US 12,185,397 B2
(45) Date of Patent: Dec. 31, 2024

(54) METHOD AND APPARATUS FOR PERFORMING SIDELINK COMMUNICATION ON BASIS OF RESOURCE ALLOCATED BY BASE STATION IN NR V2X

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR); Kyuhwan Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 539 days.

(21) Appl. No.: 17/296,940

(22) PCT Filed: Jan. 13, 2020

(86) PCT No.: PCT/KR2020/000589
§ 371 (c)(1),
(2) Date: May 25, 2021

(87) PCT Pub. No.: WO2020/145780
PCT Pub. Date: Jul. 16, 2020

(65) Prior Publication Data
US 2022/0030647 A1 Jan. 27, 2022

Related U.S. Application Data

(60) Provisional application No. 62/888,393, filed on Aug. 16, 2019, provisional application No. 62/806,751, (Continued)

(51) Int. Cl.
*H04W 76/00* (2018.01)
*H04W 28/02* (2009.01)
(Continued)

(52) U.S. Cl.
CPC ....... *H04W 76/14* (2018.02); *H04W 28/0278* (2013.01); *H04W 72/563* (2023.01); *H04W 4/40* (2018.02)

(58) Field of Classification Search
None
See application file for complete search history.

(56) References Cited

U.S. PATENT DOCUMENTS 9,763,128 B2 * 9/2017 Huang ................ H04W 72/121
2013/0322413 A1 * 12/2013 Pelletier ............... H04W 76/14
370/336
(Continued)

FOREIGN PATENT DOCUMENTS

EP 2975903 A1 * 1/2016 ....... H04L 29/08306
KR 101986274 B1 * 3/2015
(Continued)

OTHER PUBLICATIONS

PCT International Application No. PCT/KR2020/000589, International Search Report dated Apr. 22, 2020, 4 pages.
(Continued)

*Primary Examiner* — Gerald A Smarth
(74) *Attorney, Agent, or Firm* — LEE, HONG, DEGERMAN, KANG & WAIMEY

(57) ABSTRACT

Provided are a method for performing wireless communication by a first device, and an apparatus for supporting same. The method may comprise the steps of: establishing a first session for SL communication with a second device; transmitting auxiliary information relating to the SL communication to a base station; and receiving information on a resource relating to the SL communication from the base station.

12 Claims, 26 Drawing Sheets

Related U.S. Application Data filed on Feb. 15, 2019, provisional application No. 62/791,731, filed on Jan. 11, 2019.

(51) Int. Cl.
*H04W 72/563* (2023.01)
*H04W 76/14* (2018.01)
*H04W 4/40* (2018.01)

(56) References Cited

U.S. PATENT DOCUMENTS

| | | | | |
|---|---|---|---|---|
| 2015/0245375 A1* | 8/2015 | Li | ..................... | H04L 5/0051 |
| | | | | 370/329 |
| 2018/0146500 A1 | 5/2018 | Muraoka et al. | | |
| 2019/0239112 A1* | 8/2019 | Rao | ..................... | H04L 1/08 |
| 2020/0059915 A1* | 2/2020 | Lee | ..................... | H04W 56/0015 |
| 2020/0275311 A1* | 8/2020 | Zhao | ..................... | H04W 28/06 |

FOREIGN PATENT DOCUMENTS

| | | | | |
|---|---|---|---|---|
| KR | 1020170004987 | | 1/2017 | |
| KR | 1020170080609 | | 7/2017 | |
| KR | 1020180086302 | | 7/2018 | |
| WO | WO-2015113398 A1 * | 8/2015 | ............ | H04W 72/04 |
| WO | WO-2017220248 A1 * | 12/2017 | ............ | H04W 28/10 |
| WO | WO-2020088781 A1 * | 5/2020 | | |

OTHER PUBLICATIONS

LG Electronics, "Discussion on resource allocation mechanism for NR V2X," 3GPP TSG RAN WG1 Meeting #95, R1-1812844, Nov. 2018, 12 pages.

* cited by examiner (a)

(b)

(a)

(b)

METHOD AND APPARATUS FOR PERFORMING SIDELINK COMMUNICATION ON BASIS OF RESOURCE ALLOCATED BY BASE STATION IN NR V2X

CROSS-REFERENCE TO RELATED APPLICATIONS

This application is the National Stage filing under 35 U.S.C. 371 of International Application No. PCT/KR2020/000589, filed on Jan. 13, 2020, which claims the benefit of U.S. Provisional Application Nos. 62/791,731, filed on Jan. 11, 2019, 62/806,751, filed on Feb. 15, 2019, and 62/888,393, filed on Aug. 16, 2019, the contents of which are all incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in case a base station allocates SL resource(s) to a first UE, transmission resources may partially or completely overlap between the first UE and a second UE, or HALF duplex problem may occur. Accordingly, in case the base station allocates SL resource(s) to the first UE, the first UE needs to provide assistance information to solve the above-described problem.

Technical Solutions

In one embodiment, provided is a method for performing wireless communication by a first device. The method may comprise: establishing a first session for sidelink (SL) communication with a second device; transmitting, to a base station, assistance information related to the SL communication; and receiving, from the base station, information regarding a resource related to the SL communication.

In one embodiment, provided is a method for performing wireless communication by a base station. The method may comprise: receiving, from a first device, assistance information related to sidelink (SL) communication; determining a resource related to the SL communication based on the assistance information; and transmitting, to the first device, information regarding the resource related to the SL communication.

Effects of the Disclosure

The user equipment (UE) may efficiently perform SL communication.

DESCRIPTION OF EXEMPLARY EMBODIMENTS

Figure 1:
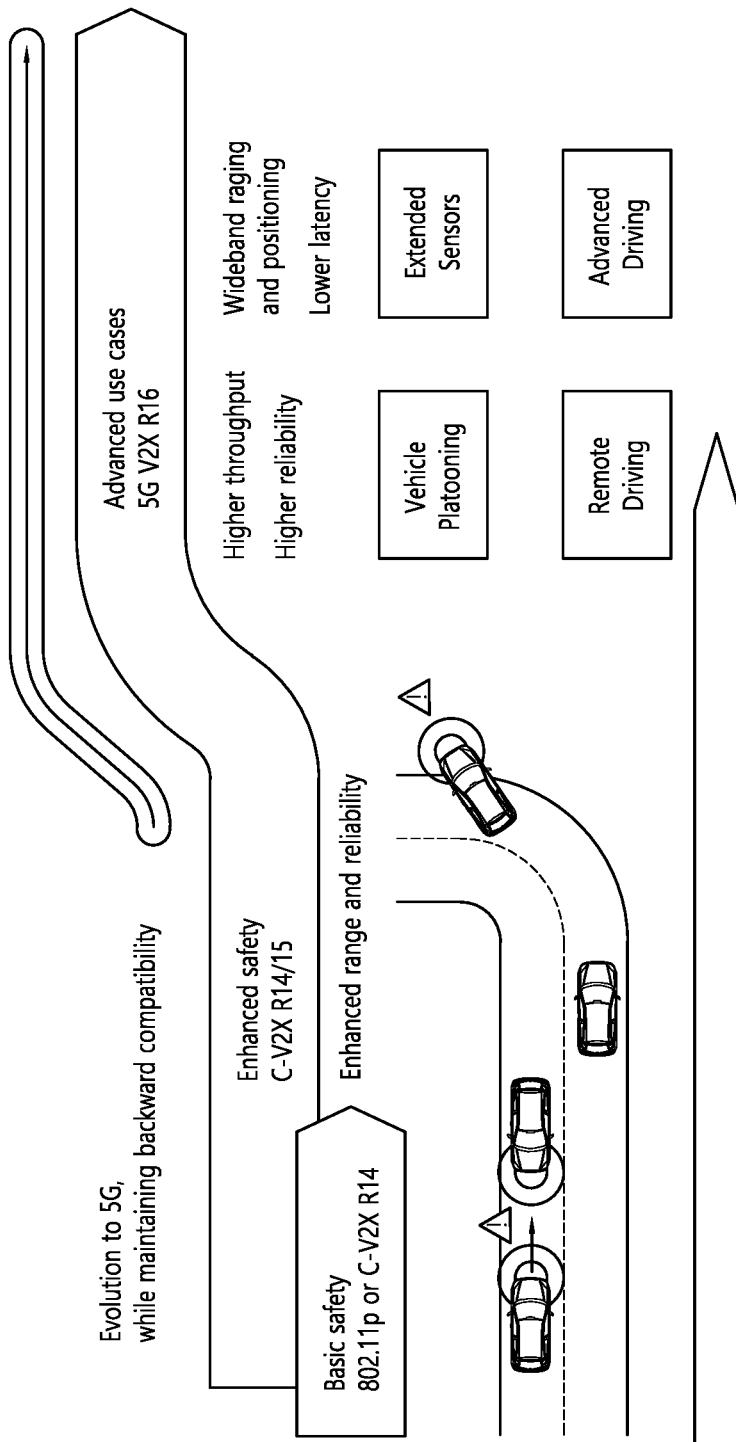
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
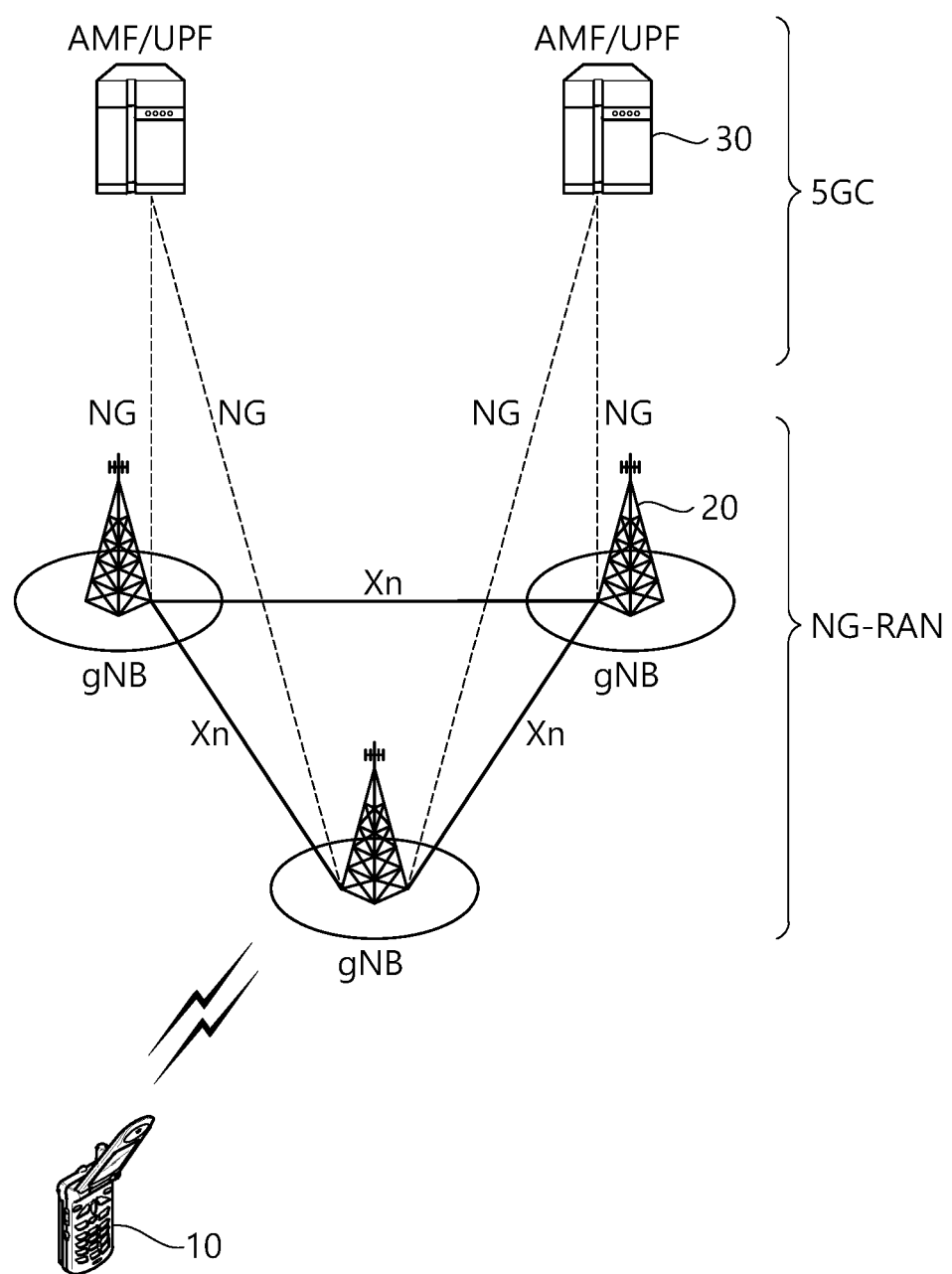
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
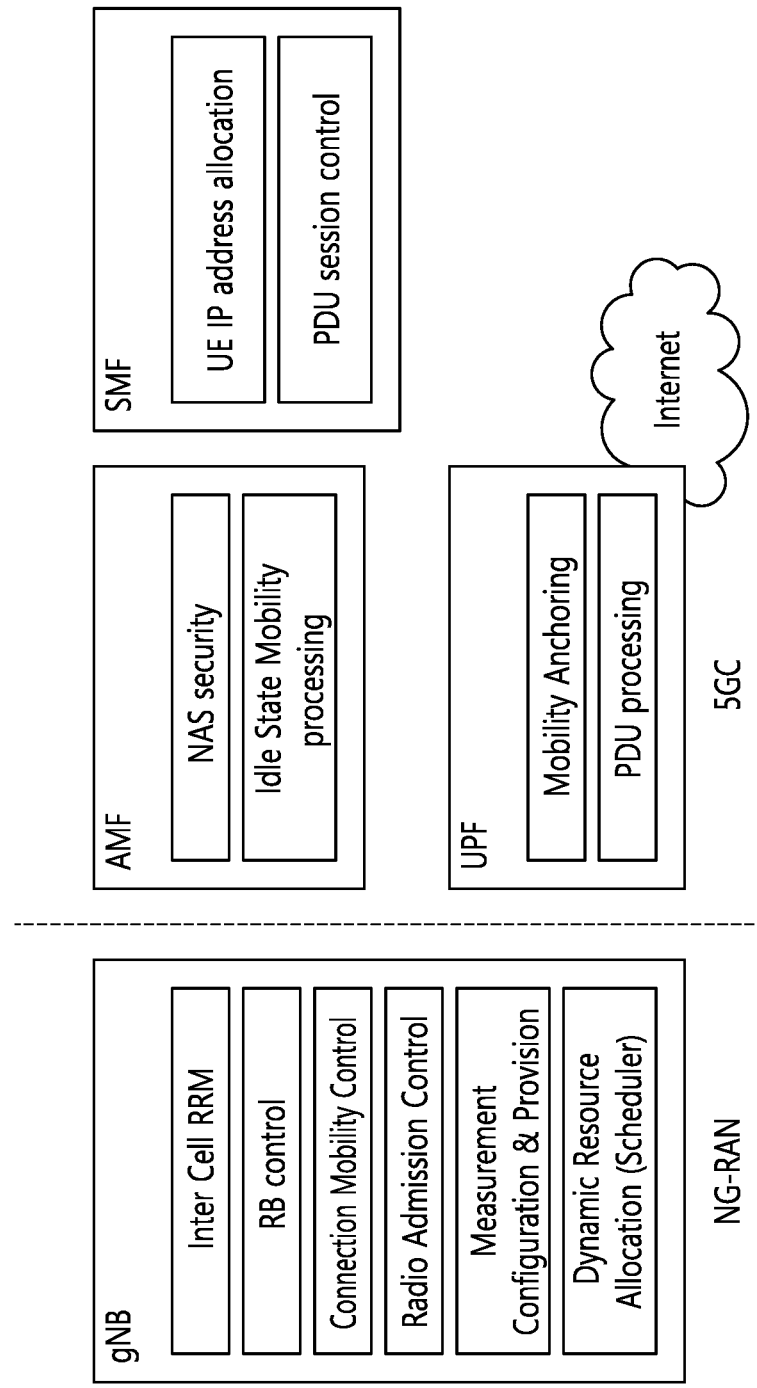
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
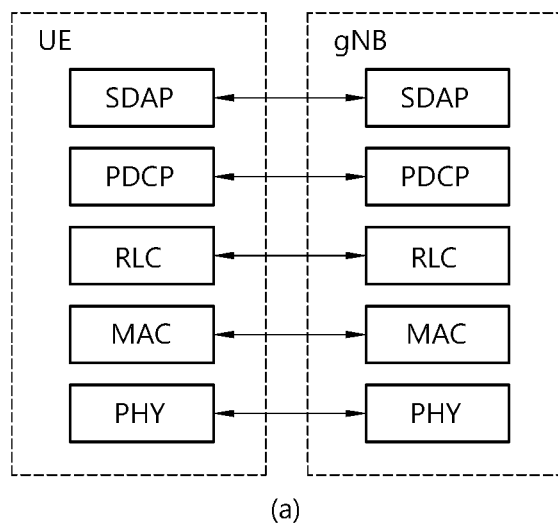
FIG. 4 shows a radio protocol architecture, in accordance with an embodiment of the present disclosure.
Figure 4:
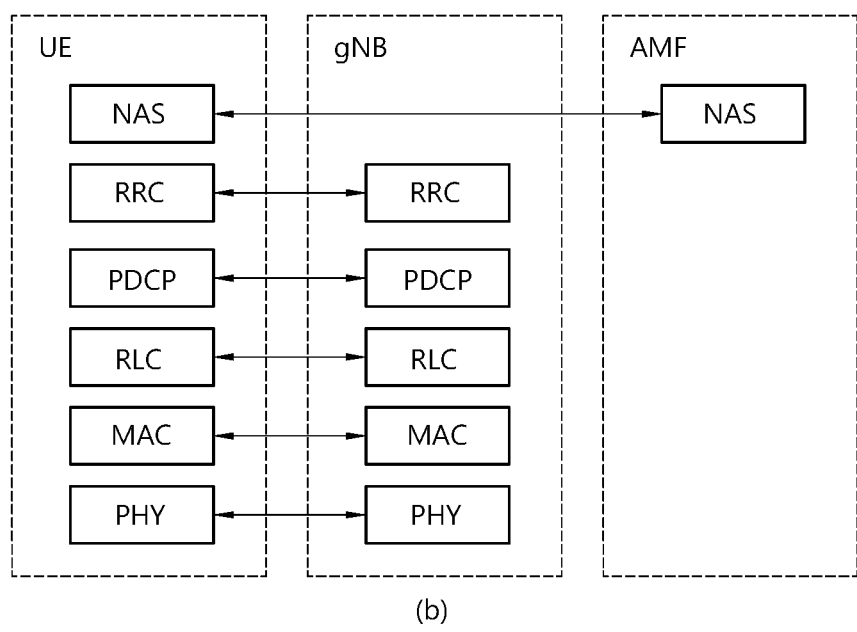

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
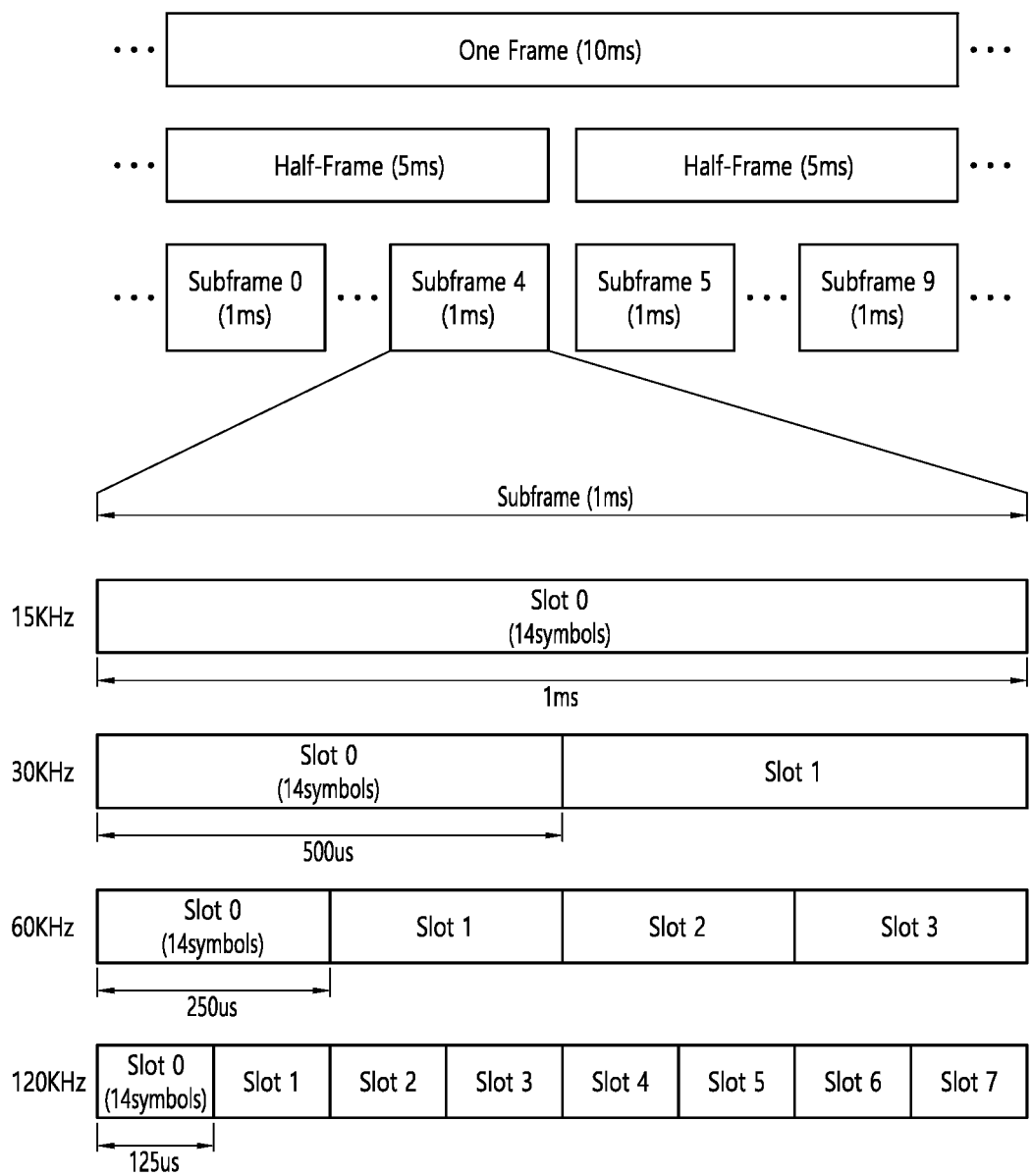
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{mask}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
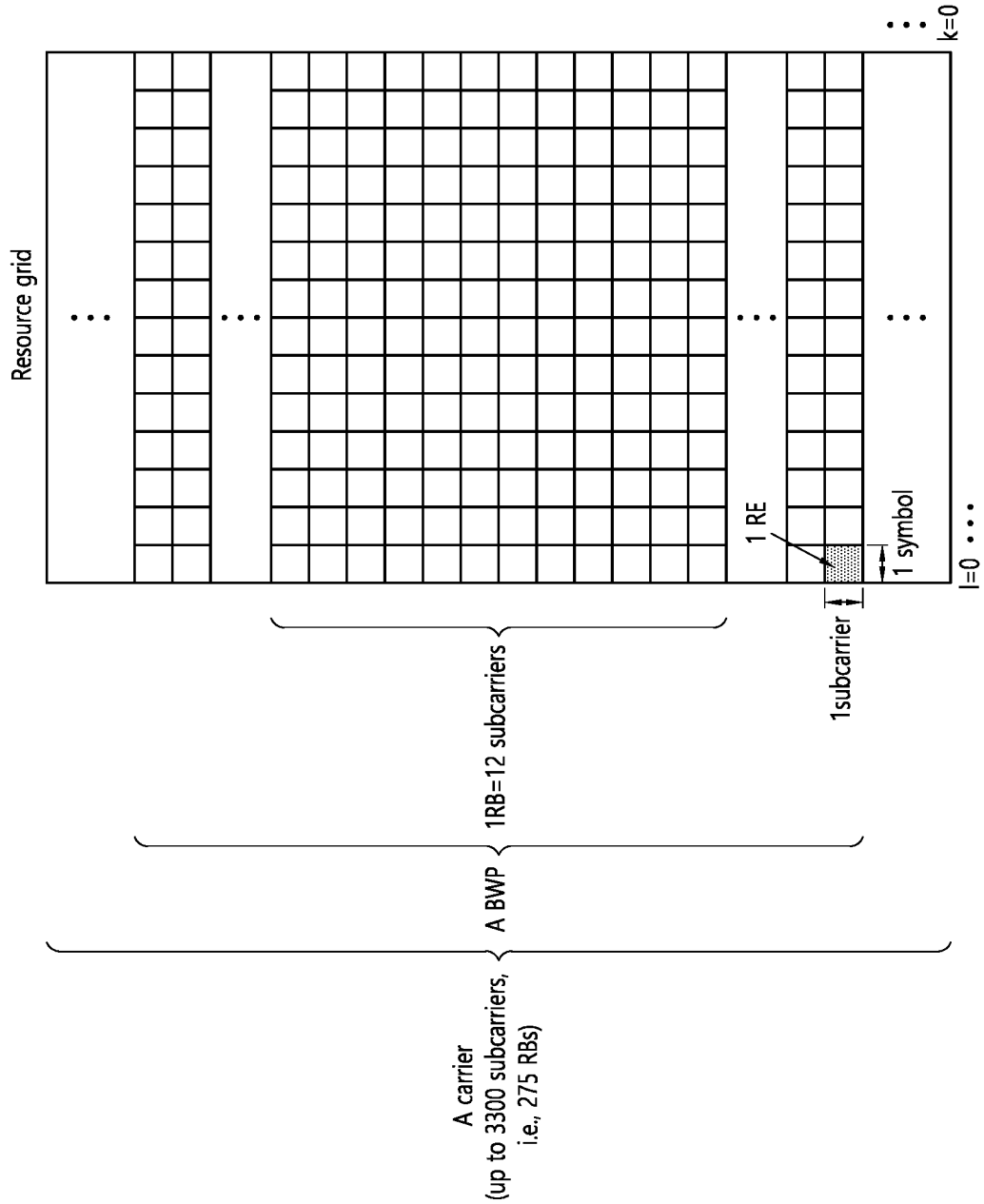
FIG. 6 shows a structure of a slot of an NR frame, in accordance with an embodiment of the present disclosure.

FIG. 6 shows a structure of a slot of an NR frame, in accordance with an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
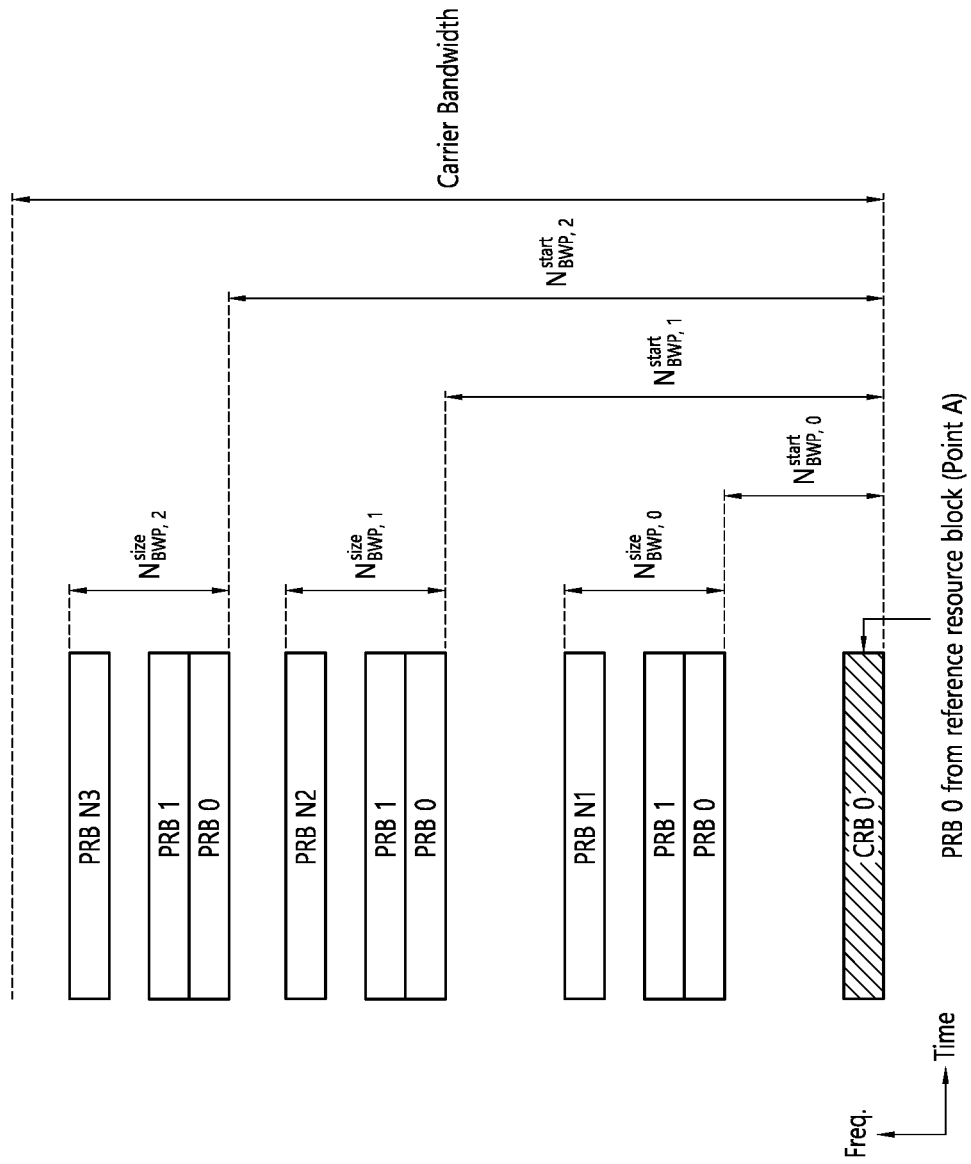
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
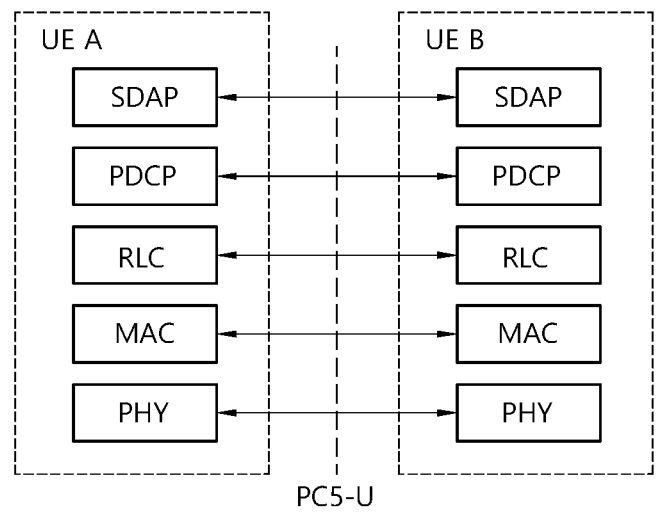
FIG. 8 shows a radio protocol architecture for a SL communication, in accordance with an embodiment of the present disclosure.
Figure 8:
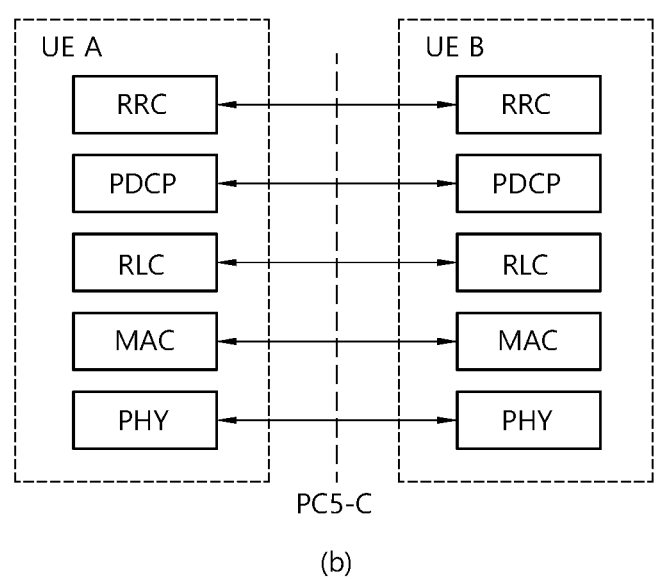

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
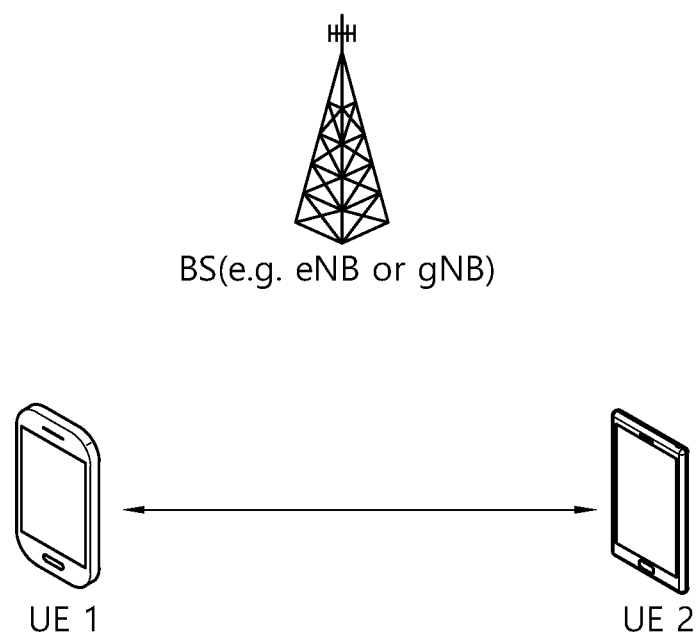
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
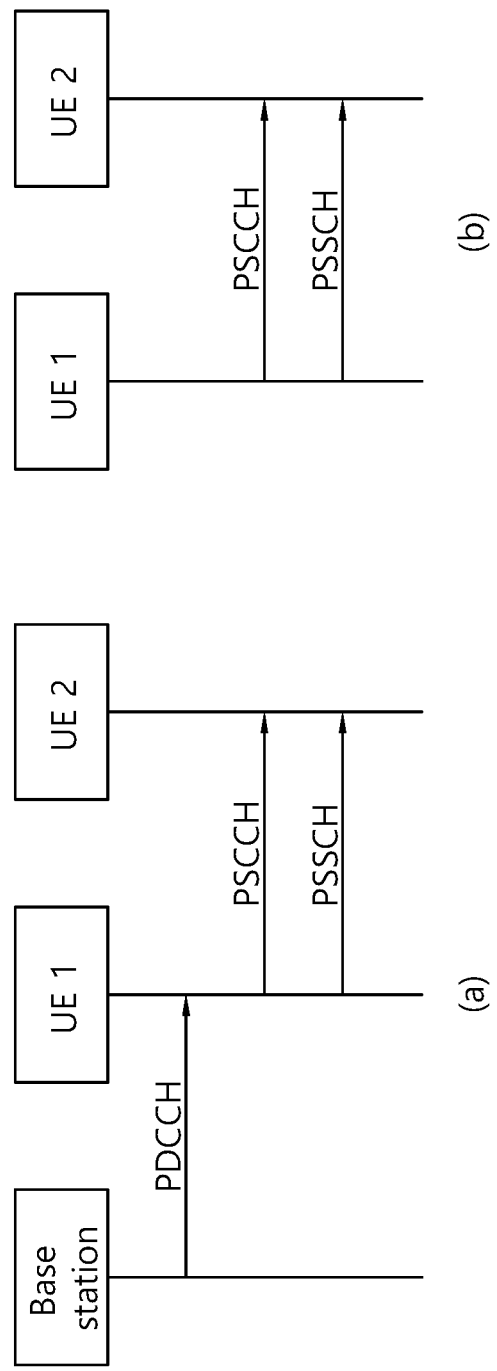
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
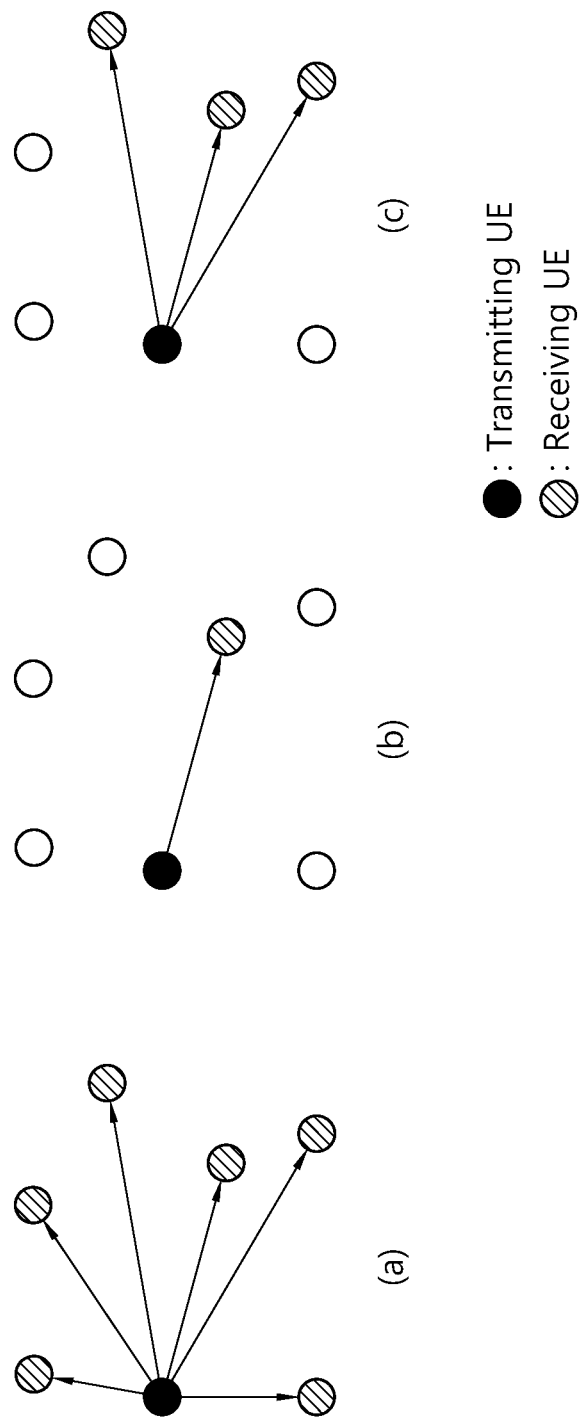
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in an NR system, a UE may receive information on a slot format. For example, an in-coverage UE may receive a subcarrier spacing and a TDD DL/UL pattern from a base station. For example, the TDD DL UL pattern may include a DL/UL transmission period, the number of consecutive DL slots, the number of consecutive DL symbols, the number of consecutive UL slots, and the number of consecutive UL symbols. In this case, the UE may know that the slot format is as shown in FIG. 12, based on the information on the slot format.

Figure 12:
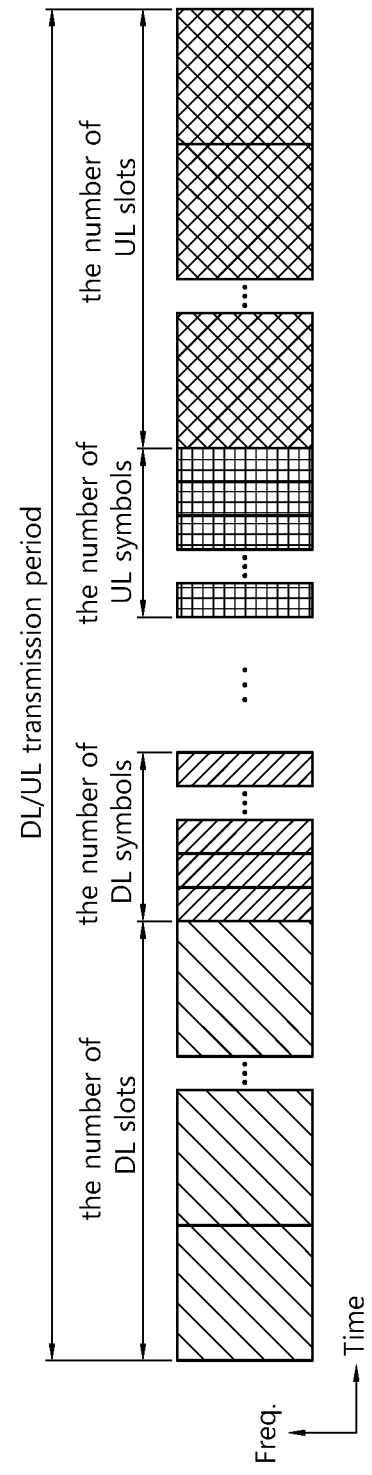
FIG. 12 shows an example of a slot format, in accordance with an embodiment of the present disclosure.

FIG. 12 shows an example of a slot format, in accordance with an embodiment of the present disclosure. The embodiment of FIG. 12 may be combined with various embodiments of the present disclosure.

As shown in the embodiment of FIG. 12, in case of an NR system, a flexible slot format may be configured. Therefore, for example, in case of the NR system, the number of symbols constituting each of UL/DL/flexible resources in a slot may be configured to be partially or entirely different between slots or BWPs.

Accordingly, for example, under an in-coverage environment, if a V2X resource pool is configured for (some) UL resources, the number of symbols in an SL slot (constituting the V2X resource pool) may be different between slots. In addition, for example, when the V2X resource pool is configured under an out-coverage environment or the like, the number of symbols in the SL slot may be different between slots. For example, when the V2X resource pool is configured without consideration of a UL resource under the out-coverage environment or the like, the number of symbols in the SL slot may be different between slots.

In the present specification, the SL slot may include at least any one of a slot in which a UE can perform sidelink communication, a slot in which the UE can perform V2X communication, a slot in which a resource pool for a sidelink is configured, and/or a slot in which a resource pool for V2X is configured. In the present specification, an SL symbol may include at least any one of a symbol in which the UE can perform sidelink communication, a symbol in which the UE can perform V2X communication, a symbol related to sidelink communication, and/or a symbol related to a sidelink. For example, the SL symbol may include at least any one of a UL symbol and/or a flexible (F) symbol.

For example, the UE may reserve a transmission resource with a specific period, by considering a (predicted) message generation pattern, a (predicted) message generation size, a message or service-related requirement (e.g., latency, reliability), and/or message or service-related priority (e.g., prose per-packet priority (PPPP), prose per-packet reliability (PPPR)), or the like. For example, the transmission resource may be semi-statically reserved. In particular, for traffic generated periodically, the UE may reserve the transmission resource with the specific period. However, for example, if the number of SL symbols constituting the SL slot is partially or entirely different between SL slots, it may be difficult to equally maintain the number of symbols constituting the transmission resource reserved by the UE with the specific period.

Figure 13:
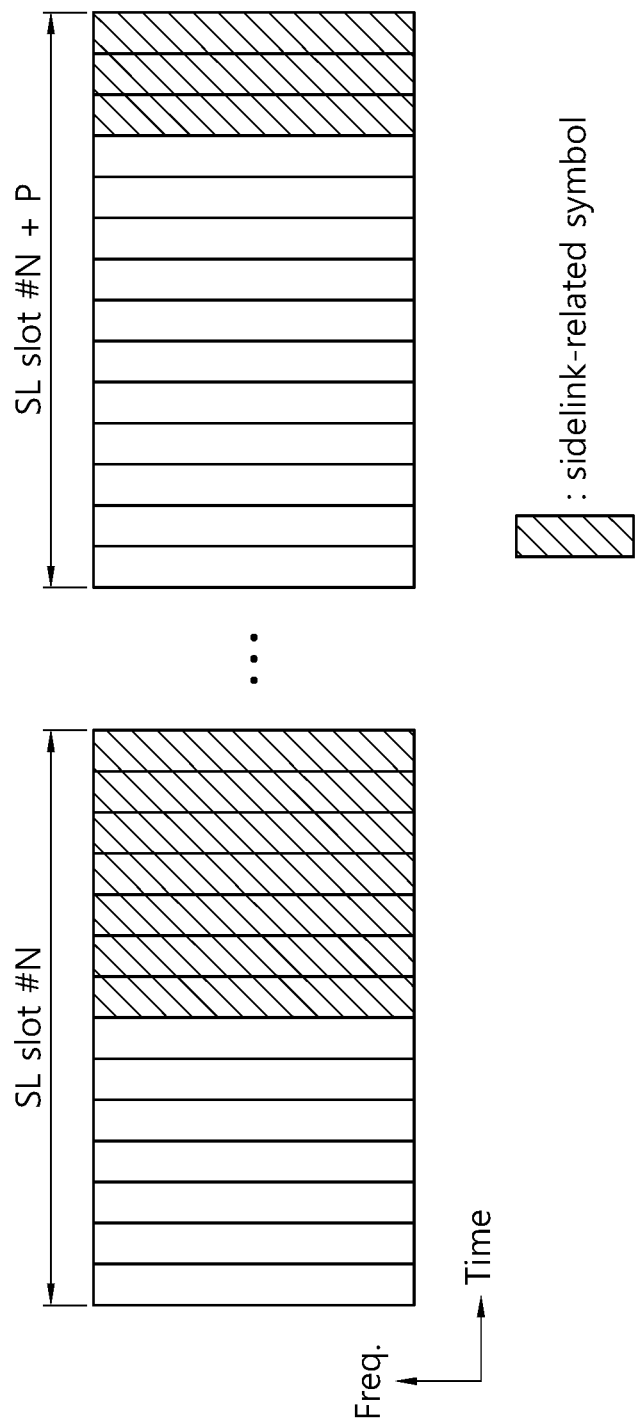
FIG. 13 is a drawing for explaining a problem which occurs due to a change in the number of symbols constituting an SL slot.

FIG. 13 is a drawing for explaining a problem which occurs due to a change in the number of symbols constituting an SL slot.

Referring to FIG. 13, it is assumed that a UE reserves a resource for sidelink transmission with a period P. In this case, a sub-channel consisting of 7 SL symbols may be present on a SL slot #N, whereas a sub-channel consisting of 3 SL symbols may be present on an SL slot #N+P. That is, the number of SL symbols may be changed between the SL slot #N and the SL slot #N+P.

In the above case, for example, there may be a problem in that a UE is unable to secure a resource amount required in message transmission at a specific timing. For example, in the embodiment of FIG. 13, the UE may be unable to stably perform sidelink communication on the SL slot #N+P, or may fail to transmit a message with high reliability. In addition, the aforementioned problem may occur not only when the UE reserves a transmission resource for transmitting a message generated periodically but also when the UE selects the transmission resource to satisfy a requirement (e.g., latency and/or reliability) of a message generated aperiodically.

Accordingly, for example, when the number of SL symbols constituting the SL slot is partially or entirely different between slots, there may be a need for a method in which the UE effectively performs sensing, resource selection, and/or resource reservation. Hereinafter, according to an embodiment of the present disclosure, there is proposed a method in which a UE performs sensing based on a resource unit and an apparatus supporting the method.

In the present specification, sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe. In the present specification, PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH).

In the present specification, a receiving operation of the UE may include a decoding operation and/or receiving operation of a sidelink channel and/or sidelink signal (e.g., PSCCH, PSSCH, PSFCH, PSBCH, PSSS/SSSS, etc.). The receiving operation of the UE may include a decoding operation and/or receiving operation of a WAN DL channel and/or WAN DL signal (e.g., PDCCH, PDSCH, PSS/SSS, etc.). The receiving operation of the UE may include a sensing operation and/or a CBR measuring operation. In the present specification, the sensing operation of the UE may include a PSSCH-RSRP measuring operation based on a PSSCH DM-RS sequence, a PSSCH-RSRP measuring operation based on a PSSCH DM-RS sequence scheduled by a PSCCH successfully decoded by the UE, a sidelink RSSI (S-RSSI) measuring operation, and/or an S-RSSI measuring operation based on a sub-channel related to a V2X resource pool. In the present specification, a transmitting operation of the UE may include a transmitting operation of a sidelink channel and/or a sidelink signal (e.g., PSCCH, PSSCH, PSFCH, PSBCH, PSSS/SSSS, etc.). The transmitting operation of the UE may include a transmitting operation of a WAN UL channel and/or a WAN UL signal (e.g., PUSCH, PUCCH, SRS, etc.). In the present specification, a synchronization signal may include an SLSS and/or a PSBCH.

In the present specification, when the same or different messages are transmitted through a plurality of antenna panels (or a beam, or a transceiver unit, or a unit having an analog beam adjustment-related phase shifter and amplifier, or an antenna element) to which partially or entirely different antenna port (AP) indices are mapped, such a transmission type may be interpreted or regarded as a sort of multi-layer transmission type. In the present specification, when the same or different messages are transmitted through a plurality of antenna panels (or a beam or an antenna element) to which the same AP index is mapped, such a transmission type may be interpreted or regarded as a sort of single-layer transmission type.

In the present specification, for example, a beam, an antenna panel, an AP, a transceiver unit, and/or an antenna element may be interpreted mutually in an extended or crossed manner. For example, the AP may include at least any one of an AP at a baseband end, an AP related to a digital beam, an AP at an RF end, and/or an AP related to an analog beam. For example, the beam may include a set of beams, the antenna panel may include a set of antenna panels, the transceiver unit may include a set of transceiver units, and the antenna element may include a set of antenna elements. For example, the antenna panel may be a unit consisting of at least any one of (pre-configured) one or a plurality of beams, (pre-configured) one or a plurality of APs, (pre-configured) one or a plurality of transceiver units, and/or (pre-configured) one or a plurality of antenna elements.

In the present specification, a configuration may include signaling, signaling from a network, a configuration from the network, and/or a pre-configuration from the network. In the present specification, a definition may include signaling, signaling from a network, a configuration form the network, and/or a pre-configuration from the network. In the present specification, a designation may include signaling, signaling from a network, a configuration from the network, and/or a pre-configuration from the network. In the present specification, a ProSe per packet priority (PPPP) may be replaced with a ProSe per packet reliability (PPPR), and the PPPR may be replaced with the PPPP. In the present specification, it may mean that the smaller the PPPP value, the higher the priority, and that the greater the PPPP value, the lower the priority. In the present specification, it may mean that the smaller the PPPR value, the higher the reliability, and that the greater the PPPR value, the lower the reliability.

Some or all of the methods proposed in the present specification may be limited to a transmitting operation of the UE, a transmission carrier selecting operation, and/or a transmission BWP selecting operation. Alternatively, for example, some or all of the methods proposed in the present specification may be limited to a receiving operation of the UE, a reception carrier selecting operation, and/or a reception BWP selecting operation.

At least one method proposed in the present specification may apply not only to sidelink communication or V2X communication based on a PC5 interface or an SL interface (e.g., PSCCH, PSSCH, PSBCH, PSSS/SSSS, etc.) but also to sidelink communication or V2X communication based on a Uu interface (e.g., PUSCH, PDSCH, PDCCH, PUCCH, etc.).

Figure 14:
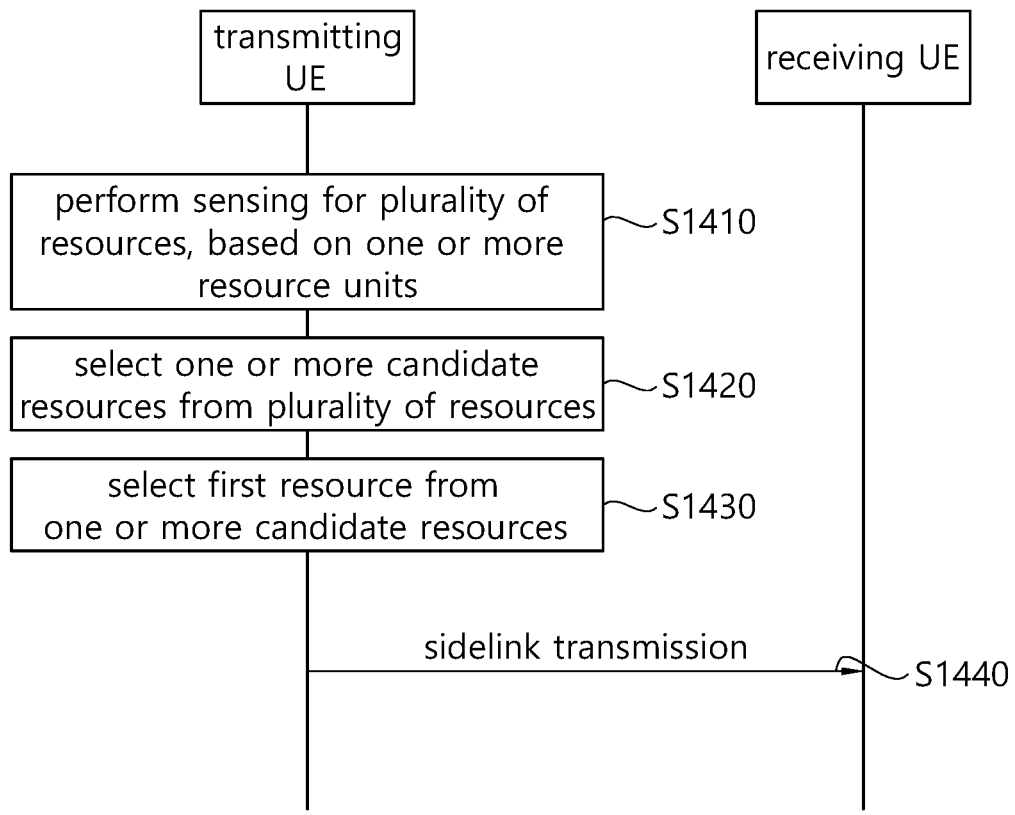
FIG. 14 shows a procedure in which a UE performs sensing based on one or more pre-configured resource units, in accordance with an embodiment of the present disclosure.

FIG. 14 shows a procedure in which a UE performs sensing based on one or more pre-configured resource units, in accordance with an embodiment of the present disclosure.

The embodiment of FIG. 14 may be combined with various embodiments of the present disclosure.

Referring to FIG. 14, in step S1410, the UE may perform sensing, based on a resource unit consisting of one or more symbols. For example, the UE may perform sensing for a plurality of resources or total resources, based on the resource unit including one or more symbols. For example, the sensing operation of the UE may include at least any one of an RSRP measurement operation and/or S-RSSI measurement operation for a PSSCH. In the present specification, for convenience of explanation, the resource unit may be referred to as BASIC_SS. For example, a PHY layer of the UE may perform sensing for the plurality of resources or total resources, based on the BASIC_SS.

For example, the number of symbols constituting the BASIC_CC may be configured for the UE or may be pre-configured. For example, the BASIC_SS may consist of a combination of one or more symbols or one or more subcarriers. For example, one BASIC_SS may be configured for the UE or may be pre-configured. For example, a plurality of BASIC_SSs may be configured for the UE or may be pre-configured.

For example, when the plurality of BASIC_SSs are configured, the number of BASIC_SSs may be the same number as that of categories for the number of SL symbols constituting the SL slot. For example, the number of BASIC_SSs may be configured to be the same as the number of SL symbols constituting the SL slot. For example, when the plurality of BASIC_SSs are configured, the number of BASIC_SSs may be the same number as that of categories for the number of SL symbols constituting the SL slot in a V2X resource pool. For example, it is assumed that the V2X resource pool includes a first SL slot, a second SL slot, and a third SL slot. In addition, it is assumed that the first SL slot includes 4 SL symbols, the second SL slot includes 7 SL symbols, and the third SL slot includes 14 SL symbols. In this case, since there are 3 categories (i.e., 4, 7, and 14) for the number of SL symbols, the number of BASIC_SSs may be set to 3.

For example, when the plurality of BASIC_SSs are configured, the number of BASIC_SSs may be less than that of the categories for the number of SL symbols constituting the SL slot. For example, when the plurality of BASIC_SSs are configured, the number of BASIC_SSs may be less than that of the categories for the number of SL symbols constituting the SL slot to decrease sensing complexity. For example, the BASIC_SS may be configured in a form of a bundle of a plurality of SL slots. For example, the BASIC_SS may be configured in a form of bundle of a plurality of SL slots having different number of symbols.

For example, an SL slot or resource in which sensing is performed with the BASIC_SS having a specific symbol count may be limited to an SL slot or resource of which a symbol count is equal to the specific symbol count. For example, the UE may perform sensing only for an SL slot or resource of which a symbol count is equal to the number of symbols constituting the BASIC_SS. For example, assuming that the BASIC_SS includes 5 symbols, the UE may perform sensing only for an SL slot or resource including 5 SL symbols.

For example, the SL slot or resource in which sensing is performed with the BASIC_SS having a specific symbol count may be limited to an SL slot or resource of which a symbol count difference (against the specific symbol count) is a first symbol count. For example, the first symbol count may be configured for the UE, or may be pre-configured. For example, the UE may perform sensing only for an SL slot or resource of which a symbol count difference against the number of symbols constituting the BASIC_SS is less than or equal to the first symbol count. For example, if it is assumed that the BASIC_SS includes 5 symbols and the first symbol count is 2, the UE may perform sensing for an SL slot or resource including 3 to 7 SL symbols. Alternatively, for example, if it is assumed that the BASIC_SS includes 5 symbols and the first symbol count is 2, the UE may perform sensing for an SL slot or resource including 3 to 5 SL symbols.

For example, the number of BASIC_SSs and/or the number of symbols constituting the BASIC_SS may be configured independently or differently according to at least any one of a V2X resource pool, a service type, a service requirement, a service priority, a message type (e.g., a message generated periodically or a message generated periodically), a PPPP, a PPPR, a priority of a logical channel, an identifier of the logical channel, and/or a numerology, or may be limited.

According to sensing for a plurality of resources or total resources, performed based on the BASIC_SS, in step S1420, the UE may select a candidate resource from the plurality of resources or total resources.

For example, a PHY layer of the UE may perform sensing for the total resources, based on the BASIC_SS, and the PHY layer of the UE may report a candidate resource of a pre-configured ratio among the total resources to a MAC layer of the UE. In the present specification, for convenience of explanation, the pre-configured ratio may be referred to as CANDI_RATIO. For example, the candidate resource may be a resource selectable by the UE and/or a resource with relatively less interference.

When one BASIC_SS is configured for the UE, the number of symbols constituting (all) candidate resources reported by the PHY layer of the UE to the MAC layer of the UE may be identical. Alternatively, when one BASIC_SS is configured for the UE, a difference in the number of symbols constituting (all) candidate resources reported by the PHY layer of the UE to the MAC layer of the UE may not exceed a pre-configured value or a pre-configured range.

For example, the total resources may consist of only a resource of which a symbol count is equal to the symbol count of the BASIC_SS. For example, when one BASIC_SS or a plurality of BASIC_SSs are configured for the UE, the total resources may limitedly consist of only a resource of which a symbol count is equal to the symbol count of the BASIC_SS. For example, the total resources may consist of only a resource of which a symbol count difference against the symbol count of the BASIC_SS is less than a pre-configured difference. For example, when one BASIC_SS or a plurality of BASIC_SSs are configured for the UE, the total resources may limitedly consist of only a resource of which a symbol count difference against the symbol count of the BASIC_SS is less than the pre-configured difference.

For example, when the plurality of BASIC_SSs are configured for the UE, the CANDI_RATIO may be uniformly split between the plurality of the BASIC_SSs. For example, it is assumed that a first BASIC_SS and a second BASIC_SS are configured for the UE, and the CANDI_RATIO is 20%. In this case, the CANDI_RATIO related to the first BASIC_SS may be 10%, and the CANDI_RATIO related to the second BASIC_SS may be 10%. Therefore, the PHY layer of the UE may report a candidate resource of 10% among resources sensed based on the first BASIC_SS to the MAC layer of the UE, and the PHY layer of the UE may report a candidate resource of 10% among resources sensed based on the second BASIC_SS to the MAC layer of the UE.

For example, when the plurality of BASIC_SSs are configured for the UE, the CANDI_RATIO may be applied independent of the plurality of BASIC_SSs. For example, when the first BASIC_SS and the second BASIC_SS are configured for the UE, the CANDI_RATIO related to the first BASIC_SS may be 20%, and the CANDI_RATIO related to the second BASIC_SS may be 20%. Therefore, the PHY layer of the UE may report a candidate resource of 20% among resources sensed based on the first BASIC_SS to the MAC layer of the UE, and the PHY layer of the UE may report a candidate resource of 20% among resources sensed based on the second BASIC_SS to the MAC layer of the UE.

For example, when the plurality of BASIC_SSs are configured for the UE, the CANDI_RATIO may be split between the BASIC_SSs according to a pre-configured ratio. For example, it is assumed that the first BASIC_SS and the second BASIC_SS are configured for the UE, and the CANDI_RATIO is 30%. In addition, it is assumed that a ratio of the CANDI_RATIO related to the first BASIC_SS and the CANDI_RATIO related to the second BASIC_SS is 1:2. In this case, the CANDI_RATIO related to the first BASIC_SS may be 10%, and the CANDI_RATIO related to the second BASIC_SS may be 20%. Therefore, the PHY layer of the UE may report a candidate resource of 10% among resources sensed based on the first BASIC_SS to the MAC layer of the UE, and the PHY layer of the UE may report a candidate resource of 20% among resources sensed based on the second BASIC_SS to the MAC layer of the UE.

In step S1430, the UE may select at least one resource from one or more candidate resources.

For example, when one BASIC_SS is configured for the UE, among the plurality of resources, the one transmission resource may be selected from candidate resources selected based on a pre-configured ratio.

For example, when the plurality of BASIC_SSs (e.g., the first BASIC_SS and the second BASIC_SS) are configured for the UE, among the plurality of resources, the one transmission resource may be selected from candidate resources selected based on the CANDI_RATIO related to the first BASIC_SS or candidate resources selected based on the CANDI_RATIO related to the second BASIC_SS. For example, when a transmission resource related to the number of symbols included in the first BASIC_SS is required in sidelink transmission, the one transmission resource may be selected from candidate resources selected based on the CANDI_RATIO related to the first BASIC_SS. For example, in order for the UE to successfully perform sidelink transmission or to satisfy a service requirement, if the number of required transmission resources is equal to the number of symbols included in the first BASIC_SS, the one transmission resource may be selected from candidate resources selected based on the CANDI_RATIO related to the first BASIC_SS. For example, when a transmission resource related to the number of symbols included in the second BASIC_SS is required in sidelink transmission, the one transmission resource may be selected from candidate resources selected based on the CANDI_RATIO related to the second BASIC_SS. For example, in order for the UE to successfully perform sidelink transmission or to satisfy a service requirement, if the number of required transmission resources is equal to the number of symbols included in the second BASIC_SS, the one transmission resource may be selected from candidate resources selected based on the CANDI_RATIO related to the second BASIC_SS.

In addition, in step S1440, the UE may perform sidelink transmission by using the selected resource. In the present specification, the sidelink transmission may include at least any one of transmission of a sidelink channel, transmission of sidelink control information, transmission of sidelink data, transmission of a sidelink packet, transmission of a sidelink service, and/or transmission of a sidelink message. For example, a MAC layer of the UE may perform message transmission by selecting one candidate resource from one or more candidate resources.

According to an embodiment of the present disclosure, due to a flexible slot format, even if the number of SL symbols is different between SL slots, the UE may perform effective sensing based on a resource unit.

According to an embodiment of the present disclosure, a transmitting UE which has reserved a transmission resource may transmit information on a reservation period of the transmission resource and information on the number of symbols of the reserved transmission resource to a receiving UE. Additionally, the transmitting UE which has reserved the transmission resource may transmit information on the number of sub-channels related to the transmission resource to the receiving UE. In the present specification, for convenience of explanation, the information on the reservation period of the transmission resource may be referred to as P_VAL, and the information on the number of symbols of the transmission resource may be referred to as RES_S-NUM.

For example, the transmitting UE may additionally signal not only the P_VAL but also the RES_SNUM on a control channel (e.g., PSCCH). Herein, for example, when a corresponding rule is applied, the receiving UE which has received the control channel on the SL slot #N may assume next transmission (of the transmitting UE) or a next transmission resource according to the following rule.

For example, when the SL slot #N+P_VAL includes symbols of which a symbol count is the RES_SNUM, the receiving UE may assume that next transmission of the transmitting UE is performed on the SL slot #N+P_VAL. Alternatively, for example, when the SL slot #N+P_VAL includes symbols of which a symbol count difference against the RES_SNUM is less than a pre-configured difference, the receiving UE may assume that next transmission of the transmitting UE is performed on the SL slot #N+P_VAL. In this case, the transmitting UE may perform next transmission on the SL slot #N+P_VAL.

For example, when the SL slot #N+P_VAL does not include symbols of which a symbol count is the RES_S-NUM, or when the SL slot #N+P_VAL does not include symbols of which a symbol count difference against the RES_SNUM is less than the pre-configured difference, the receiving UE may assume that next transmission of the transmitting UE is performed on an SL other than the SL slot #N+P_VAL. For convenience of explanation, the SL slot other than the SL slot #N+P_VAL may be referred to as a specific SL slot. Herein, for example, the specific SL slot may be a closest SL slot of which a symbol count is the RES_SNUM or of which a symbol count difference against the RES_SNUM is less than the pre-configured difference, among slots before and/or after the SL slot #N+P_VAL. In this case, the transmitting UE may perform next transmission on the specific SL slot. For example, the specific SL slot may be a slot located on the SL slot #N+P_VAL+SHIFT. For example, the specific SL slot may be a slot located on the SL slot #N+P_VAL−SHIFT.

For example, SHIFT may be a shifting value related to next transmission of the transmitting UE. For example, the SHIFT value may be a positive number. For example, the transmitting UE may signal the SHIFT value on the control channel. For example, the transmitting UE may directly signal the SHIFT value on the control channel on the SL slot #N.

For example, a location of an SL slot in which the transmitting UE performs next transmission may vary depending on whether the SL slot #N+P_VAL*2 includes symbols of which a symbol count is the RES_SNUM or of which a symbol count difference against the RES_SNUM is less than a pre-configured difference. Alternatively, for example, the location in which the transmitting UE performs next transmission may vary depending on whether the SL slot #N+P_VAL*2+SHIFT includes symbols of which a symbol count is the RES_SNUM or of which a symbol count difference against the RES_SNUM is less than the pre-configured difference. Alternatively, for example, the location of the SL slot in which the transmitting UE performs next transmission may vary depending on whether the SL slot #N+P_VAL*2−SHIFT includes symbols of which a symbol count is the RES_SNUM or of which a symbol count difference against the RES_SNUM is less than a pre-configured difference.

For example, when the transmitting UE performs next transmission on the SL slot #N+P_VAL+SHIFT, the receiving UE which has first received the control channel on the SL slot #N+P_VAL+SHIFT may not know that next transmission of the transmitting UE is determined based on the number of symbols on the SL slot #N+P_VAL*2. For example, as described above, if the SL slot #N+P_VAL does not include the symbols of which the symbol count is the RES_SNUM or of which the symbol count difference against the RES_SNUM is less than the pre-configured difference, the transmitting UE may perform next transmission on the SL slot #N+P_VAL+SHIFT. In this case, the receiving UE which has first received the control channel on the SL slot #N+P_VAL+SHIFT may not know that next transmission of the transmitting UE is determined based on the number of symbols on the SL slot #N+P_VAL*2. To solve such a problem, the transmitting UE may additionally signal information on an offset (e.g., (SL slot #N+P_VAL+SHIFT)−(SL slot #N+P_VAL)=SHIFT) between a reference timing (e.g., SL slot #N+P_VAL) and a shifting timing (e.g., SL slot #N+P_VAL+SHIFT). For example, the transmitting device which transmits the control channel on the SL slot #N+P_VAL+SHIFT may transmit the information on the offset to the receiving UE.

According to an embodiment of the present disclosure, due to a flexible slot format, when the UE cannot perform SL transmission through the reserved resource, the UE may perform SL transmission on a resource located before or after the reserved resource. Therefore, even if the number of SL symbols is changed due to the change in the slot format, the UE may effectively transmit a sidelink service related to a high priority and/or a sidelink service having a low latency requirement.

According to an embodiment of the present disclosure, when at least any one of the following conditions is satisfied, the transmitting UE may omit transmission on the SL slot #N. Additionally/alternatively, when at least any one of the following conditions is satisfied, the receiving UE may omit reception on related transmission on the SL slot #N.

If the number of SL symbols included in the SL slot #N is less than the number of symbols of a transmission resource reserved by the UE (when performing resource re-reservation), and/or If the number of SL symbols included in the SL slot #N is less than the number of symbols of the transmission resource reserved by the UE (when performing resource re-reservation) and a symbol count difference is greater than a pre-configured threshold, and/or If an (effective) coding rate derived based on the transmission resource reserved by the UE (when performing resource re-reservation) cannot be supported with the number of SL symbols included in the SL slot #N, and/or If the (effective) coding rate lower than the pre-configured threshold cannot be supported with the number of SL symbols included in the SL slot #N, and/or If the (effective) coding rate derived based on the transmission resource reserved by the UE (when performing resource re-reservation) cannot be supported with the number of SL symbols included in the SL slot #N and a symbol count difference is greater than the pre-configured threshold.

Herein, for example, the threshold may be configured independently or differently according to at least any one of a V2X resource pool, a BWP, a service type, a service requirement, a service priority, a message type (e.g., a message generated periodically or a message generated aperiodically), a PPPP, a PPPR, a priority of a logical channel, an identifier of the logical channel, and/or a numerology.

According to an embodiment of the present disclosure, when a resource amount required by the UE to transmit a message is not (sufficiently) secured on the SL slot #N, for example, when the number of SL symbols included on the SL slot #N is small, the UE may reserve and/or select a transmission resource by additionally using a resource on an SL slot adjacent to the SL slot #N. For example, the UE may reserve and/or select the transmission resource by additionally using some resources on an SL slot located before and/or after the SL slot #N. Herein, for example, a code block group (CBG) index transmitted on the different SL slot and/or a CBG count may be different, and corresponding information may be signaled through a control channel (e.g., a PSCCH) transmitted on each SL slot. Herein, for example, an indicator field for notifying that a CBG or information transmitted through a resource on a plurality of SL slots constitutes the same TB may be defined on the control channel.

According to an embodiment of the present disclosure, at least any one of a resource for transmitting a specific channel, a resource for transmitting a specific signal, and/or a specific resource may not be designated or configured as a V2X resource pool. For example, the specific channel or the specific signal may be a channel or signal for communication between a base station and a UE. Herein, for example, the resource which cannot be designated or configured as the V2X resource pool may be regarded as at least any one of a slot in which transmission of the specific channel is configured, a slot in which transmission of the specific signal is configured, and/or a slot in which the specific resource is to be configured. For example, the specific channel, the specific signal, and/or the specific resource may include at least any one of channels, signals, and/or resources listed below.

contention-based PRACH or contention-free-based PRACH, and/or periodic SRS, aperiodic SRS, single-shot SRS, multi-shot SRS, and/or grant-free (UL) SPS, for example, type 1 grant-free (UL) SPS or type 2 grant-free (UL) SPS, and/or unknown/reservation resource, and/or synchronization signal/PBCH block (SSB)

In the present specification, the unknown/reservation resource may mean a resource which is not used for a UL/DL/flexible usage.

According to an embodiment of the present disclosure, for example, the V2X resource pool may be configured (limitedly) only for the UL resource and/or the unknown/reservation resource. For example, the resource may be designated through semi-static D/U assignment signaling. For example, the D/U assignment may be signaled in a cell-specific manner. For example, the D/U assignment may be signaled in a UE-specific manner.

According to an embodiment of the present disclosure, when the UE transmits a plurality of transport blocks (TBs) through a PSSCH based on a plurality of APs or a plurality of layers, a PPPP value may be partially or entirely different between a plurality of TBs.

For example, when the PPPP value is partially or entirely different between the plurality of TBs, the UE may determine a smallest PPPP value as a representative PPPP value (hereinafter, REP_PPPP) among the plurality of PPPP values. Alternatively, for example, the UE may determine a greatest PPPP value as the REP_PPPP among the plurality of PPPP values. Alternatively, for example, the UE may determine a PPPP value of a TB related to a pre-configured service as the REP_PPPP among the plurality of PPPP values. Alternatively, for example, the UE may determine a pre-configured PPPP value as the REP_PPPP among the plurality of PPPP values. In addition, the UE may signal the REP_PPPP on a PSCCH. For example, when the PPPP value is partially or entirely different between a plurality of TBs, the UE may signal (all of) at least any one of a PPPP value for each TB, a PPPP value for each AP, and/or a PPPP value for each layer on the PSCCH. Herein, for example, it is assumed that the UE performs PSCCH transmission based on one AP or one layer.

For example, when the UE performs a congestion control (e.g., a radio layer parameter restriction and/or adjustment) based on a CBR measurement value, the UE may use the REF_PPPP value. Alternatively, for example, the UE may use a greatest PPPP value among PPPP values related to a plurality of TBs. Alternatively, for example, the UE may use a smallest PPPP value among PPPP values related to a plurality of TBs. Alternatively, for example, the UE may use a PPPP value of a TB related to a pre-configured service. Alternatively, for example, the UE may use a pre-configured PPPP value.

For example, when the UE performs sensing, for example, when the UE performs sensing for selecting a transmission resource, the UE may use the REP_PPPP value. Alternatively, for example, the UE may use a greatest PPPP value among PPPP values related to a plurality of TBs. Alternatively, for example, the UE may use a smallest PPPP value among PPPP values related to a plurality of TBs. Alternatively, for example, the UE may use a PPPP value of a TB related to a pre-configured service. Alternatively, for example, the UE may use a pre-configured PPPP value.

For example, when the UE distributes transmit power between carriers and/or BWPs, for example, when a sum of power required to simultaneously transmit a channel and/or a signal on a plurality of carriers and/or a plurality of BWPs exceeds a maximum transmit power value of the UE, the UE may use the REF_PPPP value. Alternatively, for example, the UE may use a greatest PPPP value among PPPP values related to a plurality of TBs. Alternatively, for example, the UE may use a smallest PPPP value among PPPP values related to a plurality of TBs. Alternatively, for example, the UE may use a PPPP value of a TB related to a pre-configured service. Alternatively, for example, the UE may use a pre-configured PPPP value.

For example, when the UE performs CR measurement, multi-TB transmission may be regarded and/or considered in a CR value as (single-)TB transmission related to the REP_PPPP value. Alternatively, for example, the multi-TB transmission may be regarded and/or considered in a CR value as transmission of the number (i.e., NUM_PPTB) of TBs related to a different PPPP value. For example, in this case, it may be configured that transmission for each PPPP is normalized with the NUM_PPTB and then considered in each CR value. Alternatively, a pre-configured (relatively) high weight may be applied to TB transmission related to a specific PPPP value which uses relatively many layers or APs. Alternatively, a pre-configured (relatively) low weight may be applied to TB transmission related to a specific PPPP value which uses relatively many layers or APs.

In addition, for example, the UE may independently perform a sensing operation, a congestion control operation based on a CBR measurement value, and/or a CR measurement operation for each AP. Alternatively, for example, the UE may independently perform a sensing operation, a congestion control operation based on a CBR measurement value, and/or a CR measurement operation for each layer. Alternatively, for example, the UE may independently perform a sensing operation, a congestion control operation based on a CBR measurement value, and/or a CR measurement operation for each TB. For example, when the UE performs a sensing operation, a congestion control operation based on a CBR measurement value, and/or a CR measurement operation for each AP and/or TB, the UE may consider a PPPP value or (common) REP_PPPP value for each AP, layer, and/or TB.

In the present specification, for example, the radio layer parameter restriction and/or adjustment may include at least any one of maximum transmit power (including zero power transmission), a range of a retransmission count for each TB, a range of a PSSCH resource block, a range of an MCS, and/or a maximum limit on occupancy ratio (CR_LIMIT). In addition, the radio layer parameter restriction and/or adjustment may be configured differently or independently for each combination of a CBR value and a PPPP value (of a message).

According to an embodiment of the present disclosure, if a resource consisting of K symbols (e.g., a frequency resource consisting of K symbols) is designated for the purpose of transmitting a sidelink synchronization signal and/or a PSBCH, the resource or the number of SL symbols related to the resource may always be guaranteed. For example, if the resource consisting of the K symbols in the SL symbol is designated for the purpose of transmitting the sidelink synchronization signal and/or the PSBCH, the resource or the number of SL symbols related to the resource may always be guaranteed regardless of a change in a format of the SL slot. For example, if the resource consisting of the K symbols in the SL slot is designated for the purpose of transmitting the sidelink synchronization signal, the PSBCH, a pre-configured specific channel, and/or a pre-configured specific signal, then the resource or the number of SL symbols related to the resource may always be guaranteed regardless of the change in the format of the SL slot.

Meanwhile, if there are many SL symbols in the SL slot, more symbols may be allocated for a control channel, compared to a case where there are few SL symbols in the SL slot. For example, the number of PSCCH-related symbols may be 3 when there are 14 SL symbols in the SL slot, whereas the number of PSCCH-related symbols may be 1 when there are 7 SL symbols in the SL slot. Therefore, in case of the aforementioned example, there is a need to change the DM-RS pattern related to the PSCCH.

Therefore, according to an embodiment of the present disclosure, for example, a DM-RS pattern of a control channel (e.g., PSCCH) or a DM-RS pattern of a pre-configured channel/signal may be configured for the UE for each number of symbols constituting a corresponding channel/signal or may be pre-configured. For example, the DM-RS pattern may be configured in a semi-static manner for each number of symbols constituting the channel and/or signal. Herein, for example, when the rule is applied, complexity of blind detection of the UE may be decreased. For example, when the rule is applied, complexity of blind detection for detecting the DM-RS pattern by the UE may be decreased. For example, since the UE knows the DM-RS pattern for each number of symbols constituting the channel and/or signal, the UE may not perform complex blind detection to detect the DM-RS pattern.

In addition, according to an embodiment of the present disclosure, for example, the number of symbols constituting the control channel or the pre-configured channel/signal may be configured for the UE or may be pre-configured. For example, the number of symbols may be configured in a semi-static manner.

For example, the DM-RS pattern and/or the number of symbols constituting the channel/signal may be configured independently or differently according to at least any one of a V2X resource pool, a BWP, a service type, a service requirement, a service priority, a message type (e.g., a message generated periodically or a message generated aperiodically), a PPPP, a PPPR, a priority of a logical channel, an identifier of the logical channel, and/or a numerology.

Figure 15:
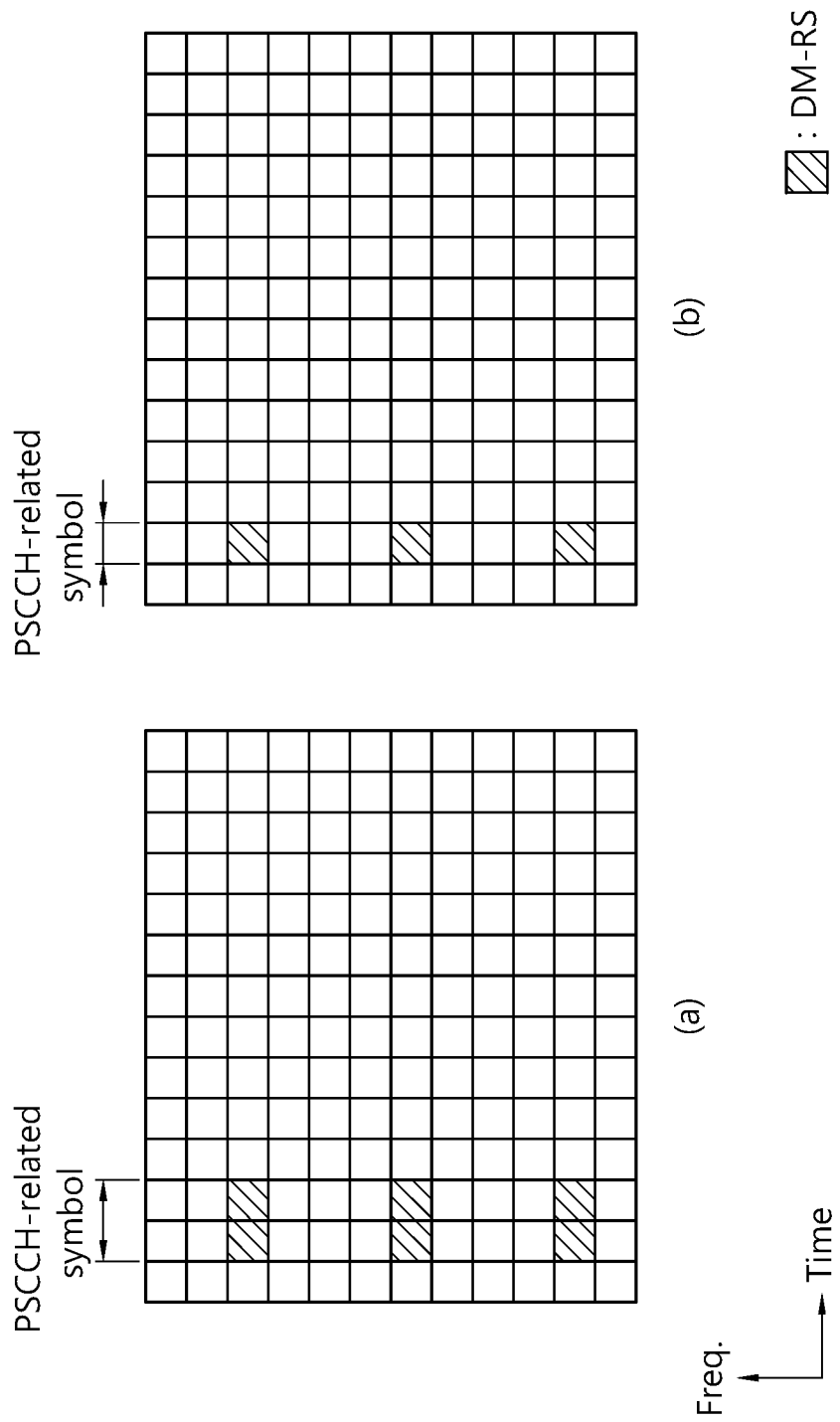
FIG. 15 shows an example in which a DM-RS pattern is configured differently for each number of symbols constituting a channel, in accordance with an embodiment of the present disclosure.

FIG. 15 shows an example in which a DM-RS pattern is configured differently for each number of symbols constituting a channel, in accordance with an embodiment of the present disclosure. The embodiment of FIG. 15 may be combined with various embodiments of the present disclosure.

Referring to (a) and (b) of FIG. 15, a DM-RS pattern may be configured differently for each number of symbols constituting a PSCCH. Although the PSCCH is taken for example for convenience of explanation, the technical idea of the present disclosure is not limited thereto. That is, the DM-RS pattern may be configured for the UE or may be pre-configured, for each number of symbols constituting a control channel or a pre-configured channel/signal. In addition, the DM-RS pattern shown in the embodiment of FIG. 15 is for exemplary purposes only, and the DM-RS pattern may be defined in various forms.

Meanwhile, for example, in case of an NR system, after a UL SPS time/frequency resource (i.e., ULSPS_RSC) is configured for the UE through RRC signaling or (activation) DCI, if the number of symbols related to the ULSPS_RSC is changed or not guaranteed on a specific slot, the UE may omit UL SPS transmission on the specific slot. Herein, for example, in case of a V2X service having a relatively low latency and/or high reliability, it may not be desirable to operate in this manner.

Therefore, according to an embodiment of the present disclosure, in a case where an uplink semi persistent scheduling (UL SPS) time/frequency resource is configured for the UE for the purpose of V2X communication, even if the number of symbols related to the resource is changed on a specific slot, the UE may perform UL SPS transmission when at least any one of the following conditions is satisfied. For example, when at least any one of the following conditions is satisfied, the UE may perform UL SPS transmission on the specific slot by applying rate matching or puncturing for the changed number of symbols.

- If a coding rate required for UL SPS transmission does not exceed a pre-configured (effective) coding rate, and/or
- If there is no increase in the (effective) coding rate against previous transmission, and/or
- If an increase in the (effective) coding rate against previous transmission does not exceed a pre-configured threshold, and/or
- If the changed or decreased number of symbols is less than the pre-configured threshold, and/or
- If a DM-RS pattern of initial transmission can be maintained.

Meanwhile, a UE operating based on LTE transmission mode 3 or NR resource allocation mode 1 may perform SL communication with other target UE(s). Hereinafter, for convenience of description, the UE operating based on LTE transmission mode 3 or NR resource allocation mode 1 may be referred to as a MODE 3 UE. For example, other target UE(s) may include at least one of MODE 3 UE(s) of the same base station, UE(s) in an RRC_IDLE state within a coverage of another base station, UE(s) in an RRC_IDLE state within a coverage of the same base station, UE(s) in an RRC_CONNECTED state within a coverage of another base station, UE(s) in an RRC_CONNECTED state within a coverage of the same base station, and/or UE(s) in an out-of-coverage state. For example, the MODE 3 UE may perform SL communication after establishing SL session(s) with other target UE(s). For example, the SL communication may be unicast communication or groupcast communication.

According to an embodiment of the present disclosure, in case the MODE 3 UE performs SL communication with other target UE(s), the MODE 3 UE may transmit/signal assistance information to a base station of the MODE 3 UE.

For example, the assistance information may include at least one of information related to the target UE. For example, the information related to the target UE may include an identifier of the target UE, an identifier of a serving cell to which the target UE belongs, C-RNTI, information related to an in-coverage state or out-of-coverage state of the target UE, (L1 or L2) destination ID information, and/or local (L1 or L2) ID information allocated to the target UE for SL communication.

For example, the assistance information may include information related to the MODE 3 UE (i.e., information related to itself). For example, the information related to the MODE 3 UE may include at least one of an identifier of the MODE 3 UE, C-RNTI, (L1 or L2) source ID information, and/or local (L1 or L2) ID information allocated to the MODE 3 UE for SL communication.

For example, the assistance information may include at least one of information related to transmission resource(s) preferred by the target UE, information related to reception resource(s) preferred by the target UE, information related to transmission resource(s) not preferred by the target UE, and/or information related to reception resource(s) not preferred by the target UE. For example, the assistance information may include at least one of information related to transmission resource(s) preferred by the MODE 3 UE, information related to reception resource(s) preferred by the MODE 3 UE, information related to transmission resource(s) not preferred by the MODE 3 UE, and/or information related to reception resource(s) not preferred by the MODE 3 UE.

For example, the assistance information may include information related to session(s). For example, the MODE 3 UE may establish one or more sessions with one or more target UEs, and in this case, the assistance information may include information related to one or more sessions. For example, the information related to session(s) may include at least one of a session ID, a source ID, a destination ID, and/or an application ID.

For example, the assistance information may include information related to preferred transmission resource(s) for each session. For example, the MODE 3 UE may determine preferred transmission resource(s) for each session, by considering a reception operation through its other SL session(s). For example, the MODE 3 UE may determine preferred transmission resource(s) for each session, by considering a WAN DL reception operation from a base station. For example, if the MODE 3 UE determines preferred transmission resource(s) for each session based on the reception operation through its other SL session(s) or the WAN DL reception operation, a problem that a transmission/reception operation of the MODE 3 UE simultaneously occurs/requires on the same slot can be alleviated. For example, if the MODE 3 UE determines preferred transmission resource(s) for each session based on the reception operation through its other SL session(s) or the WAN DL reception operation, the mode 3 UE may determine preferred transmission resource(s) for each session so that preferred transmission resource(s) for each session does not overlap in a time domain with resource(s) for performing the reception operation through other SL session(s) and resource(s) for performing the WAN DL reception operation.

For example, the MODE 3 UE may determine preferred transmission resource(s) for each session, by considering a transmission operation through its other SL session(s). For example, the MODE 3 UE may determine preferred transmission resource(s) for each session, by considering a WAN UL transmission operation to a base station. For example, if the MODE 3 UE determines preferred transmission resource(s) for each session based on the transmission operation through its other SL session(s) or the WAN UL transmission operation, a problem of overlapping transmission resources between different sessions can be alleviated. For example, if the MODE 3 UE determines preferred transmission resource(s) for each session based on the transmission operation through its other SL session(s) or the WAN UL transmission operation, a problem of overlapping transmission resources between SL and WAN UL can be alleviated.

For example, the MODE 3 UE may receive information related to preferred transmission resource(s) for each session from the target UE. Herein, for example, for a session received from the target UE, information related to transmission resource(s) preferred by the MODE 3 UE may be resource(s) for which the target UE does not perform a transmission operation.

For example, the assistance information may include information related to non-preferred transmission resource(s) for each session. For example, the MODE 3 UE may determine non-preferred transmission resource(s) for each session, by considering a reception operation through its other SL session(s). For example, the MODE 3 UE may determine non-preferred transmission resource(s) for each session, by considering a WAN DL reception operation from a base station. For example, if the MODE 3 UE determines non-preferred transmission resource(s) for each session based on the reception operation through its other SL session(s) or the WAN DL reception operation, a problem that a transmission/reception operation of the MODE 3 UE simultaneously occurs/requires on the same slot can be alleviated. For example, if the MODE 3 UE determines non-preferred transmission resource(s) for each session based on the reception operation through its other SL session(s) or the WAN DL reception operation, the mode 3 UE may determine non-preferred transmission resource(s) for each session so that non-preferred transmission resource(s) for each session overlaps in a time domain with resource(s) for performing the reception operation through other SL session(s) and resource(s) for performing the WAN DL reception operation.

For example, the MODE 3 UE may determine non-preferred transmission resource(s) for each session, by considering a transmission operation through its other SL session(s). For example, the MODE 3 UE may determine non-preferred transmission resource(s) for each session, by considering a WAN UL transmission operation to a base station. For example, if the MODE 3 UE determines non-preferred transmission resource(s) for each session based on the transmission operation through its other SL session(s) or the WAN UL transmission operation, a problem of overlapping transmission resources between different sessions can be alleviated. For example, if the MODE 3 UE determines non-preferred transmission resource(s) for each session based on the transmission operation through its other SL session(s) or the WAN UL transmission operation, a problem of overlapping transmission resources between SL and WAN UL can be alleviated.

For example, the MODE 3 UE may receive information related to non-preferred transmission resource(s) for each session from the target UE. Herein, for example, for a session received from the target UE, information related to transmission resource(s) non-preferred by the MODE 3 UE may be resource(s) for which the target UE performs a transmission operation.

For example, the assistance information may include information related to preferred reception resource(s) for each session. For example, the MODE 3 UE may determine preferred reception resource(s) for each session, by considering a transmission operation through its other SL session(s). For example, the MODE 3 UE may determine preferred reception resource(s) for each session, by considering a WAN UL transmission operation to a base station. For example, if the MODE 3 UE determines preferred reception resource(s) for each session based on the transmission operation through its other SL session(s) or the WAN UL transmission operation, a problem that a transmission/reception operation of the MODE 3 UE simultaneously occurs/requires on the same slot can be alleviated. For example, if the MODE 3 UE determines preferred reception resource(s) for each session based on the transmission operation through its other SL session(s) or the WAN UL transmission operation, the mode 3 UE may determine preferred reception resource(s) for each session so that preferred reception resource(s) for each session does not overlap in a time domain with resource(s) for performing the transmission operation through other SL session(s) and resource(s) for performing the WAN UL transmission operation.

For example, the MODE 3 UE may determine preferred reception resource(s) for each session, by considering a reception operation through its other SL session(s). For example, the MODE 3 UE may determine preferred reception resource(s) for each session, by considering a WAN DL reception operation from a base station. For example, if the MODE 3 UE determines preferred reception resource(s) for each session based on the reception operation through its other SL session(s) or the WAN DL reception operation, a problem of overlapping reception resources between different sessions can be alleviated. For example, if the MODE 3 UE determines preferred reception resource(s) for each session based on the reception operation through its other SL session(s) or the WAN DL reception operation, a problem of overlapping reception resources between SL and WAN DL can be alleviated.

For example, the MODE 3 UE may receive information related to preferred reception resource(s) for each session from the target UE. Herein, for example, for a session received from the target UE, information related to reception resource(s) preferred by the MODE 3 UE may be resource(s) for which the target UE can perform a transmission operation to the MODE 3 UE.

For example, the assistance information may include information related to non-preferred reception resource(s) for each session. For example, the MODE 3 UE may determine non-preferred reception resource(s) for each session, by considering a transmission operation through its other SL session(s). For example, the MODE 3 UE may determine non-preferred reception resource(s) for each session, by considering a WAN UL transmission operation to a base station. For example, if the MODE 3 UE determines non-preferred reception resource(s) for each session based on the transmission operation through its other SL session(s) or the WAN UL transmission operation, a problem that a transmission/reception operation of the MODE 3 UE simultaneously occurs/requires on the same slot can be alleviated. For example, if the MODE 3 UE determines non-preferred reception resource(s) for each session based on the transmission operation through its other SL session(s) or the WAN UL transmission operation, the mode 3 UE may determine non-preferred reception resource(s) for each session so that non-preferred reception resource(s) for each session overlaps in a time domain with resource(s) for performing the transmission operation through other SL session(s) and resource(s) for performing the WAN UL transmission operation.

For example, the MODE 3 UE may determine non-preferred reception resource(s) for each session, by considering a reception operation through its other SL session(s). For example, the MODE 3 UE may determine non-preferred reception resource(s) for each session, by considering a WAN DL reception operation from a base station. For example, if the MODE 3 UE determines non-preferred reception resource(s) for each session based on the reception operation through its other SL session(s) or the WAN DL reception operation, a problem of overlapping reception resources between different sessions can be alleviated. For example, if the MODE 3 UE determines non-preferred reception resource(s) for each session based on the reception operation through its other SL session(s) or the WAN DL reception operation, a problem of overlapping reception resources between SL and WAN DL can be alleviated.

For example, the MODE 3 UE may receive information related to non-preferred reception resource(s) for each session from the target UE. Herein, for example, for a session received from the target UE, information related to reception resource(s) non-preferred by the MODE 3 UE may be resource(s) for which the target UE cannot perform a transmission operation to the MODE 3 UE. For example, resource(s) for which the target UE cannot perform the transmission operation to the MODE 3 UE may be resource(s) for which the target UE receives packet(s) from other UE(s).

In case the proposed rule is applied, for example, a base station that has received information on reception resource(s) preferred for a session from the MODE 3 UE may allocate the corresponding resource as MODE 3 transmission resource(s) of (related) target UE(s). In case the proposed rule is applied, for example, a base station that has received information related to reception resource(s) non-preferred for a session from the MODE 3 UE may allocate other resource(s) (not overlapping in a time domain) as MODE 3 transmission resource(s) of (related) target UE(s).

For example, the assistance information may include session-related QoS information and/or SL communication-related QoS information.

For example, the assistance information may include buffer status report (BSR) information for each session. For example, the assistance information may include (representative/reference) BSR information of the largest size among a plurality of BSR information for a plurality of sessions. For example, the assistance information may include (representative/reference) BSR information of an average size of a plurality of BSR information for a plurality of sessions. For example, the assistance information may include (representative/reference) BSR information of a sum size of a plurality of BSR information for a plurality of sessions. For example, the assistance information may include information related to a plurality of preferred transmission resources linked with/related to (representative/reference) BSR information and/or information related to a plurality of preferred reception resources linked with/related to (representative/reference) BSR information. For example, the assistance information may include BSR information of the target UE and/or BSR information of the MODE 3 UE (i.e., own BSR information).

For example, as described above, if the MODE 3 UE transmits the assistance information to a base station of the MODE 3 UE, it is possible to alleviate a problem that transmission resources partially or entirely overlap between the MODE 3 UE and the target UE when the base station allocates/schedules transmission resource(s) and/or reception resource(s) to the MODE 3 UE. In addition, it is possible to alleviate a problem that transmission resources partially or entirely overlap between a plurality of sessions of the MODE 3 UE. In addition, it is possible to alleviate an occurrence of a HALF duplex problem. In addition, it is possible to alleviate scheduling/instruction of the WAN UL transmission operation and/or the WAN DL reception operation by the base station to the MODE 3 UE on resource(s) in which the MODE 3 UE receives packet(s) from the target UE.

Additionally, for example, if the MODE 3 UE transmits the assistance information to a base station of the MODE 3 UE, the base station receiving the assistance information may allocate resource(s) to the MODE 3 UE or the target UE. For example, when the base station receiving the assistance information allocates resource(s) to the MODE 3 UE or the target UE, the base station may additionally inform which target UE each allocated resource is to be used for through pre-defined signaling. Additionally/alternatively, for example, the base station may additionally inform which session each allocated resource is to be used for through pre-defined signaling. Additionally/alternatively, for example, the base station may additionally inform which cast type each allocated resource is to be used for through pre-defined signaling. Additionally/alternatively, for example, the base station may additionally inform which service type each allocated resource is to be used for through pre-defined signaling. For example, the pre-defined signaling may be DCI or higher layer signaling.

Herein, for example, in case the base station signals/schedules SL configured grant (CG) to the MODE 3 UE, the base station may transmit target UE information or (L1 or L2) destination ID information linked for each SL configured grant process to the MODE 3 UE through RRC signaling. For example, the SL configured grant may include type 1 SL configured grant and/or type 2 SL configured grant. For example, in case the base station signals/schedules the SL configured grant to the MODE 3 UE, the base station may transmit target UE information or (L1 or L2) destination ID information linked for each SL configured grant process to the MODE 3 UE through a pre-configured field on the SL DCI (e.g., type 2 configured grant). For example, the grant process may be replaced with a grant index.

According to an embodiment of the present disclosure, the MODE 3 UE may report UE assistance information related to SL communication to a base station. For example, the UE assistance information related to SL communication may include at least one of a traffic generation period, a subframe offset, a (maximum) packet/traffic size, priority, and/or (L2) destination ID information. For example, when the MODE 3 UE reports the UE assistance information related to SL communication to the base station, the MODE 3 UE may transmit at least one of (L1 or L2) source ID information of its (i.e., MODE 3 UE) used for SL communication (e.g., unicast communication) with the target UE, identifier information (e.g., C-RNTI), local (L1 or L2) ID information of its assigned for SL communication, and/or information included in the assistance information, to the base station together. In this case, for example, the base station receiving the corresponding information and the target UE information of the MODE 3 UE may allocate resource(s) so that the above-described problem does not occur between a pair of UEs performing SL communication.

For example, the MODE 3 UE may be configured to report information included in the assistance information and/or information transmitted together with the UE assistance information to a base station, whenever (L1 or L2) ID information related to the MODE 3 UE or the target UE, application ID related to SL communication, Provider Service Identifier (PSID) and/or Intelligent Transport Systems Application Identifier (ITS-AID) are/is updated. For example, the MODE 3 UE may report information included in the assistance information and/or information transmitted together with the UE assistance information to a base station, whenever (L1 or L2) ID information related to the MODE 3 UE or the target UE, application ID related to SL communication, Provider Service Identifier (PSID) and/or Intelligent Transport Systems Application Identifier (ITS-AID) are/is updated. For example, (L1 or L2) ID information related to the MODE 3 UE or the target UE may include at least one of a source ID, a destination ID, and/or a local ID.

Figure 16:
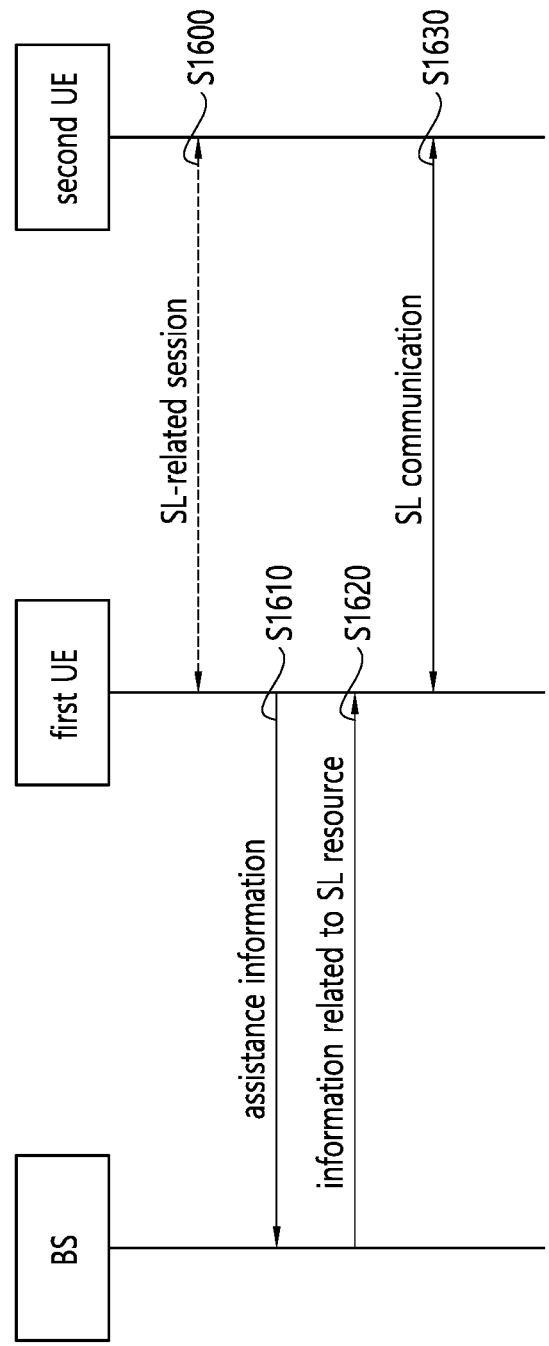
FIG. 16 shows a procedure for a first UE to transmit assistance information to a base station, in accordance with an embodiment of the present disclosure.

FIG. 16 shows a procedure for a first UE to transmit assistance information to a base station, in accordance with an embodiment of the present disclosure. The embodiment of FIG. 16 may be combined with various embodiments of the present disclosure.

Referring to FIG. 16, in step S1600, the first UE may establish SL-related session(s) with a second UE. For example, in case the first UE performs connection-less groupcast communication with the second UE, the step of establishing SL-related session(s) with the second UE by the first UE may be omitted.

In step S1610, the first UE may transmit assistance information to the base station. For example, the assistance information may include information related to resource(s) preferred by the first UE and information related to resource(s) preferred by the second UE. For example, the assistance information may include information related to intersection resource(s) of resource(s) preferred by the first UE and resource(s) preferred by the second UE. To this end, the first UE may receive information related to resource(s) preferred by the second UE from the second UE. Additionally, for example, the assistance information may include various types of information described above. For example, the assistance information may include information related to whether or not the second UE is within a coverage of the base station.

In step S1620, the base station may allocate SL resource(s) to the first UE based on the assistance information. In addition, the base station may transmit information related to the SL resource(s) to the first UE. For example, information related to the SL resource(s) may be transmitted through SL DCI.

In step S1630, the first UE may perform SL communication with the second UE by using the SL resource(s). For example, the first UE may perform SL transmission to the second UE by using the SL resource(s).

Figure 17:
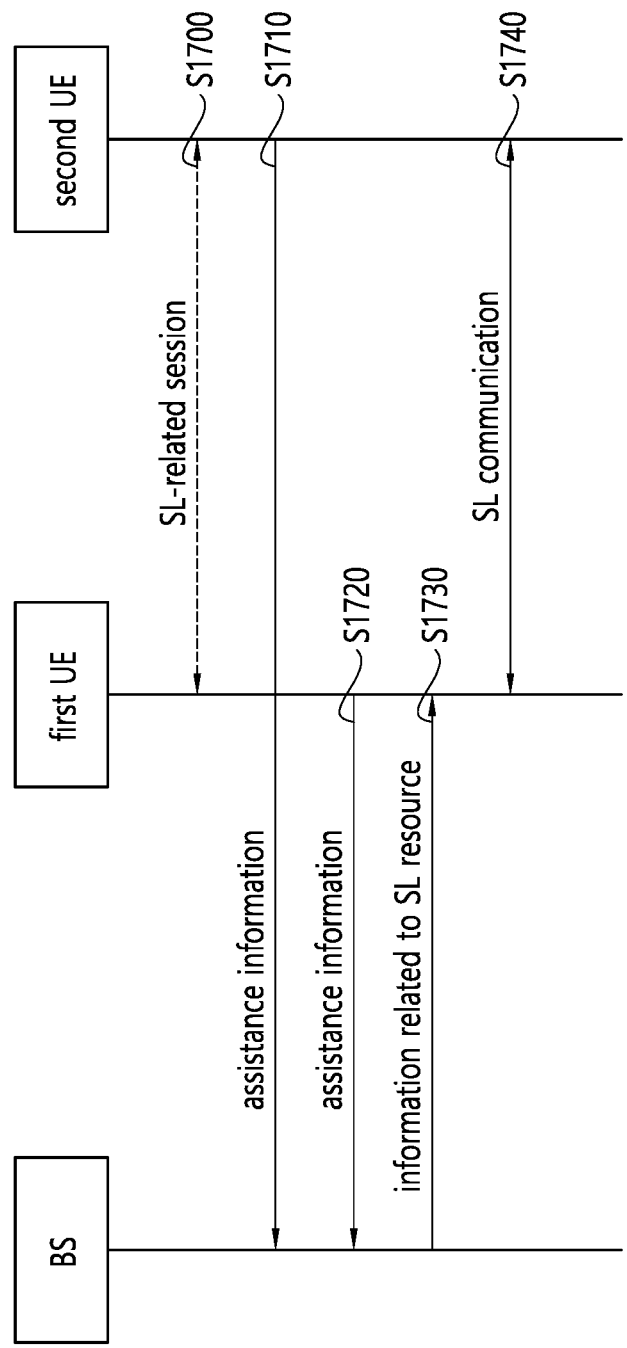
FIG. 17 shows a procedure for transmitting assistance information to a base station by a first UE and a second UE, in accordance with an embodiment of the present disclosure.

FIG. 17 shows a procedure for transmitting assistance information to a base station by a first UE and a second UE, in accordance with an embodiment of the present disclosure. The embodiment of FIG. 17 may be combined with various embodiments of the present disclosure.

Referring to FIG. 17, in step S1700, the first UE may establish SL-related session(s) with the second UE. For example, in case the first UE performs connection-less groupcast communication with the second UE, the step of establishing SL-related session(s) with the second UE by the first UE may be omitted.

In step S1710, the first UE may transmit assistance information to the base station. For example, the assistance information may include information related to resource(s) preferred by the first UE. Additionally, for example, the assistance information may include various types of information described above.

In step S1720, the second UE may transmit assistance information to the base station. For example, the assistance information may include information related to resource(s) preferred by the second UE. Additionally, for example, the assistance information may include various types of information described above. For example, the assistance information may include information related to whether or not the second UE is within a coverage of the base station.

In step S1730, the base station may determine SL resource(s) to be allocated to the first UE based on the assistance information. For example, the base station may determine SL resource(s) to be allocated to the first UE from an intersection of resource(s) preferred by the first UE and resource(s) preferred by the second UE. For example, if the second UE is outside a coverage of the base station, the base station may determine SL resource(s) to be allocated to the first UE based on the assistance information received from the second UE. For example, if the second UE is outside the coverage of the base station, since the base station cannot control the second UE, the assistance information transmitted by the second UE may have priority over the assistance information transmitted by the first UE.

In addition, the base station may transmit information related to the SL resource(s) to the first UE. For example, the information related to the SL resource(s) may be transmitted through SL DCI.

In step S1740, the first UE may perform SL communication with the second UE by using the SL resource(s). For example, the first UE may perform SL transmission to the second UE by using the SL resource(s).

Figure 18:
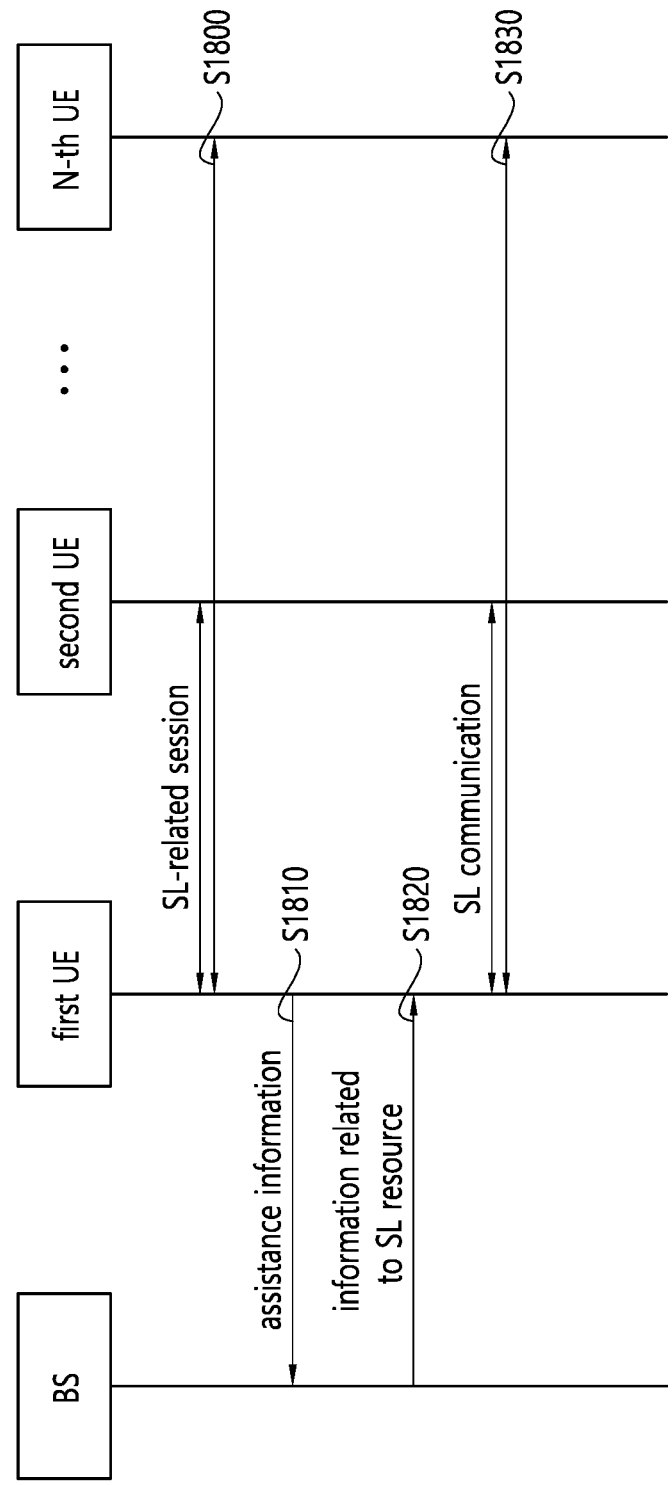
FIG. 18 shows a procedure for a first UE to transmit assistance information to a base station, in accordance with an embodiment of the present disclosure.

FIG. 18 shows a procedure for a first UE to transmit assistance information to a base station, in accordance with an embodiment of the present disclosure. The embodiment of FIG. 18 may be combined with various embodiments of the present disclosure.

Referring to FIG. 18, in step S1800, the first UE may establish a plurality of SL-related sessions with a plurality of UEs.

In step S1810, the first UE may transmit assistance information to the base station. For example, the assistance information may include information related to BSR for each of a plurality of sessions. For example, the assistance information may include information related to the largest BSR among information related to the BSR for each of a plurality of sessions.

In step S1820, the base station may allocate SL resource(s) to the first UE based on the assistance information.

For example, if the assistance information includes information related to the BSR for each of a plurality of sessions, the base station may allocate a different amount of SL resources for each session to the first UE. In this case, while the resource allocation efficiency of the base station may be improved, the complexity of the base station may increase.

For example, if the assistance information includes information related to the largest BSR among information related to the BSR for each of a plurality of sessions, the base station may allocate the same amount of SL resources for each session to the first UE. In this case, while the resource allocation efficiency of the base station may be reduced, the complexity of the base station may be reduced.

In addition, the base station may transmit information related to the SL resource(s) to the first UE. For example, information related to the SL resource(s) may be transmitted through SL DCI.

In step S1830, the first UE may perform SL communication with a plurality of UEs by using the SL resource(s). For example, the first UE may perform SL transmission to a plurality of UEs by using the SL resource(s).

Figure 19:
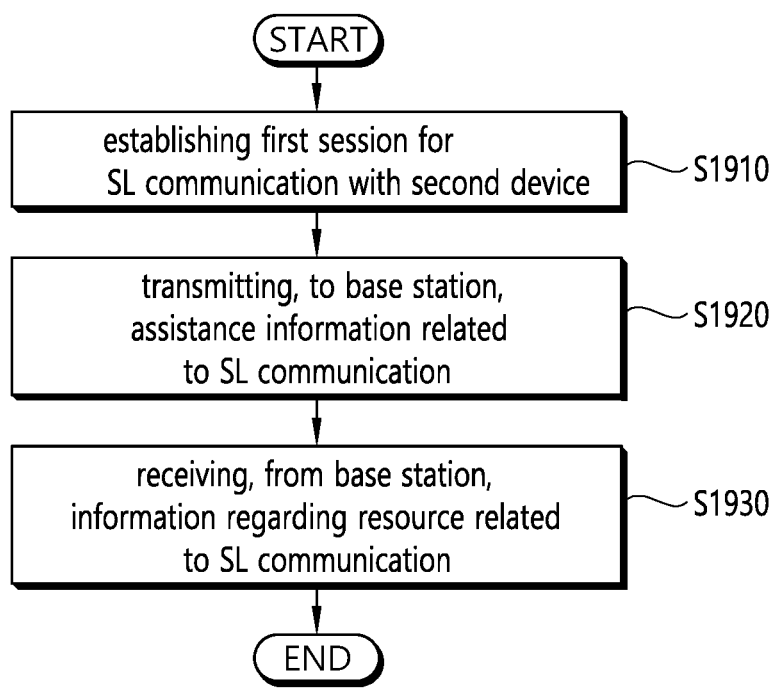
FIG. 19 shows a method for performing wireless communication by a first device, in accordance with an embodiment of the present disclosure.

FIG. 19 shows a method for performing wireless communication by a first device, in accordance with an embodiment of the present disclosure. The embodiment of FIG. 19 may be combined with various embodiments of the present disclosure.

Referring to FIG. 19, in step S1910, the first device may establish a first session for sidelink (SL) communication with a second device.

In step S1920, the first device may transmit, to a base station, assistance information related to the SL communication.

In step S1930, the first device may receive, from the base station, information regarding a resource related to the SL communication.

For example, the resource related to the SL communication may be determined by the base station based on the assistance information.

For example, the assistance information may include an identifier of the second device. For example, the assistance information may include an identifier of a serving cell to which the second device belongs. For example, the assistance information may include information regarding the first session. For example, the assistance information may include information regarding a resource related to the SL communication preferred by the first device on the first session. Additionally, for example, the first device may receive, from the second device, information regarding a resource related to the SL communication preferred by the second device on the first session. In this case, the assistance information may include the information regarding the resource related to the SL communication preferred by the second device on the first session. For example, the assistance information may include information regarding a buffer status report (BSR) related to a size of data to be transmitted by the first device on the first session.

Additionally, for example, the first device may establish a second session for SL communication with a third device. In this case, based on a size of data to be transmitted by the first device on the second session being greater than a size of data to be transmitted by the first device on the first session, the assistance information may include information regarding a buffer status report (BSR) related to the size of data to be transmitted by the first device on the second session. For example, the assistance information may include information regarding one or more resources related to the SL communication preferred by the first device, and the one or more resources may be resources related to information regarding BSR related to a size of data to be transmitted by the first device.

For example, the information regarding the resource related to the SL communication may include at least one of information related to a UE to which the first device performs the SL communication by using the resource, or information related to a session to which the first device performs the SL communication by using the resource.

Additionally, for example, the first device may perform the SL communication with the second device by using the resource related to the SL communication.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. Herein, the one or more processors may execute the instructions to: establish a first session for sidelink (SL) communication with a second device; transmit, to a base station, assistance information related to the SL communication; and receive, from the base station, information regarding a resource related to the SL communication.

According to an embodiment of the present disclosure, an apparatus configured to control a first user equipment (UE) may be provided. For example, the apparatus may comprise:

One or more processors; and one or more memories operably connected to the one or more processors and storing instructions. Herein, the one or more processors may execute the instructions to: establish a first session for sidelink (SL) communication with a second UE; transmit, to a base station, assistance information related to the SL communication; and receive, from the base station, information regarding a resource related to the SL communication.

According to an embodiment of the present disclosure, a non-transitory computer-readable storage medium storing instructions may be provided. Herein, the instructions, when executed, may cause a first device to: establish a first session for sidelink (SL) communication with a second device; transmit, to a base station, assistance information related to the SL communication; and receive, from the base station, information regarding a resource related to the SL communication.

Figure 20:
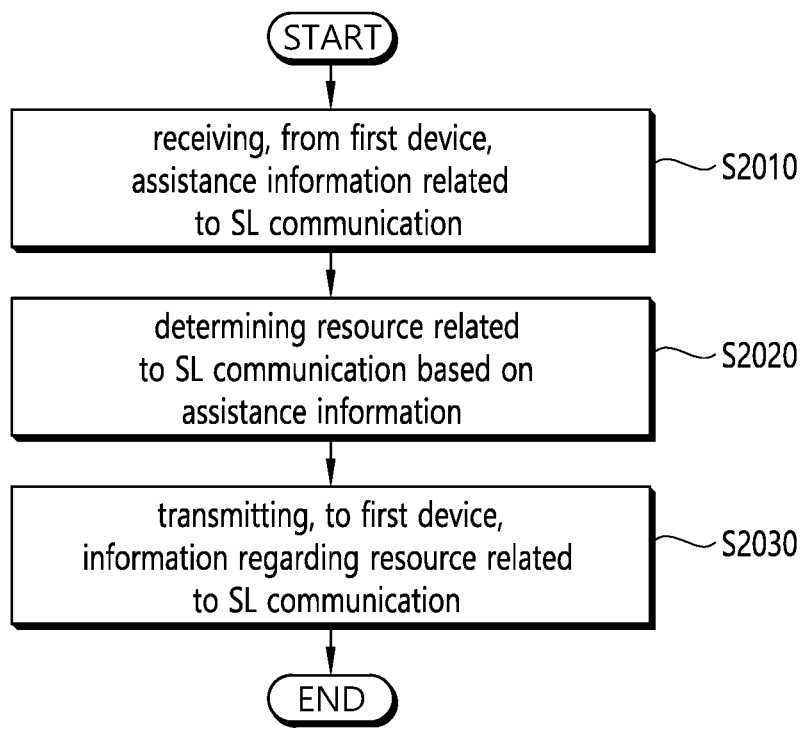
FIG. 20 shows a method for performing wireless communication by a base station, in accordance with an embodiment of the present disclosure.

FIG. 20 shows a method for performing wireless communication by a base station, in accordance with an embodiment of the present disclosure. The embodiment of FIG. 20 may be combined with various embodiments of the present disclosure.

Referring to FIG. 20, in step S2010, the base station may receive, from a first device, assistance information related to sidelink (SL) communication. In step S2020, the base station may determine a resource related to the SL communication based on the assistance information. In step S2030, the base station may transmit, to the first device, information regarding the resource related to the SL communication. For example, the assistance information may include information related to the SL communication between the first device and a second device.

According to an embodiment of the present disclosure, a base station configured to perform wireless communication may be provided. For example, the base station may comprise: one or more memories storing instructions; one or more transceivers; and one or more processors connected to the one or more memories and the one or more transceivers. Herein, the one or more processors may execute the instructions to: receive, from a first device, assistance information related to sidelink (SL) communication; determine a resource related to the SL communication based on the assistance information; and transmit, to the first device, information regarding the resource related to the SL communication. For example, the assistance information may include information related to the SL communication between the first device and a second device.

The various embodiments of the present disclosure may be independently implemented. Alternatively, the various embodiments of the present disclosure may be implemented by being inter-combined or integrated. For example, although the various embodiments of the present disclosure are described based on a 3GPP system for simplicity in the description, the various embodiments of the present disclosure may also be extendedly applied to other system apart from the 3GPP system. For example, the various embodiments of the present disclosure will not be restricted only to direct communication between UEs and may also be used in uplink or downlink. At this point, a base station or relay node, and so on, may use the proposed methods according to the various embodiments of the present disclosure. For example, information on whether the method according to various embodiments of the present disclosure is applied may be defined to be transmitted, from a base station to a UE or from a transmitting UE to a receiving UE, through pre-defined signals (e.g., physical layer signals or higher layer signals). For example, information on rules according to various embodiments of the present disclosure may be defined to be transmitted, from a base station to a UE or from a transmitting UE to a receiving UE, through pre-defined signals (e.g., physical layer signals or higher layer signals). For example, among the various embodiments of the present disclosure, some of the embodiments may be limitedly applied only to resource allocation mode 1. For example, among the various embodiments of the present disclosure, some of the embodiments may be limitedly applied only to resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
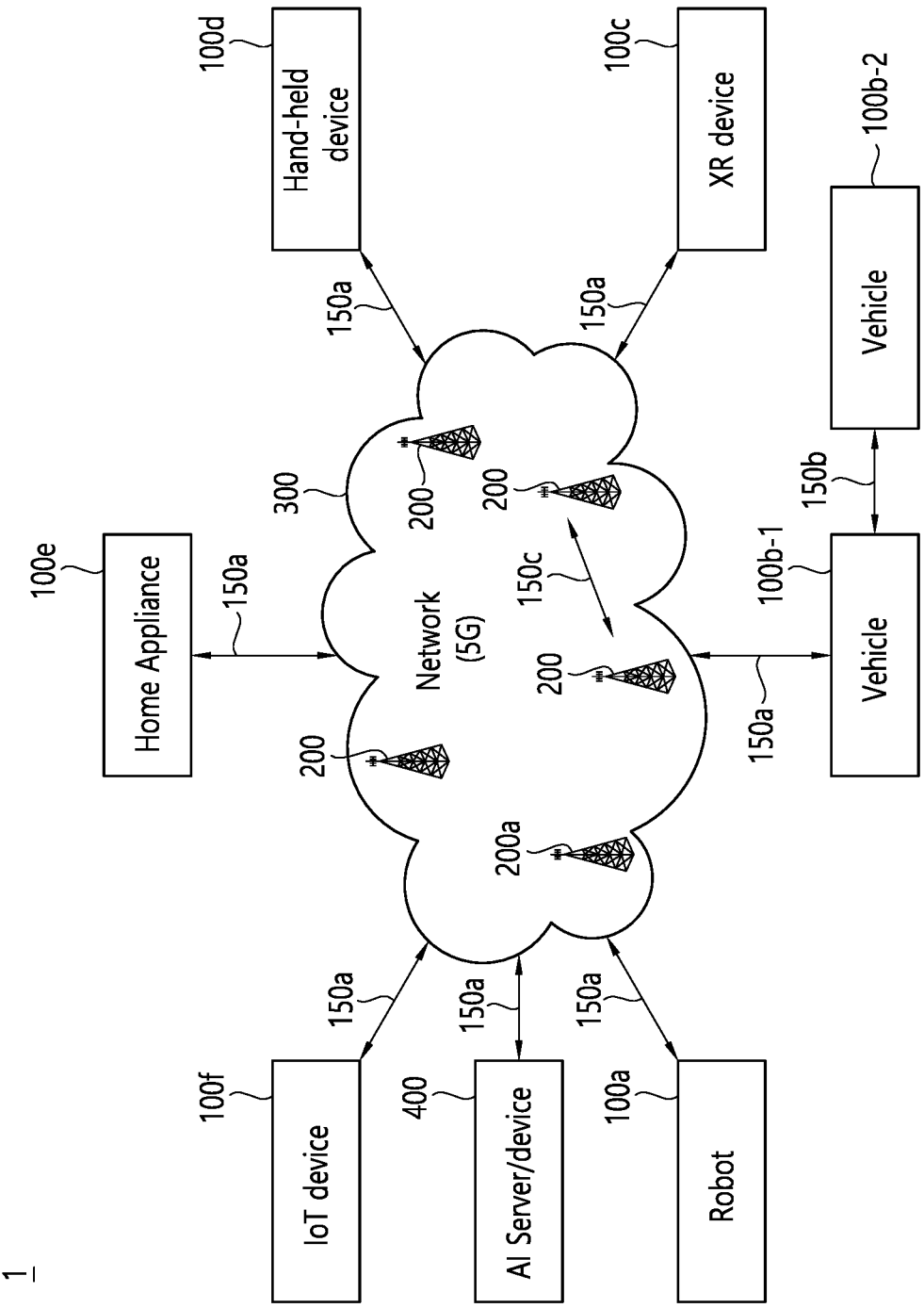
FIG. 21 shows a communication system 1, in accordance with an embodiment of the present disclosure.

FIG. 21 shows a communication system 1, in accordance with an embodiment of the present disclosure.

Referring to FIG. 21, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication(e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
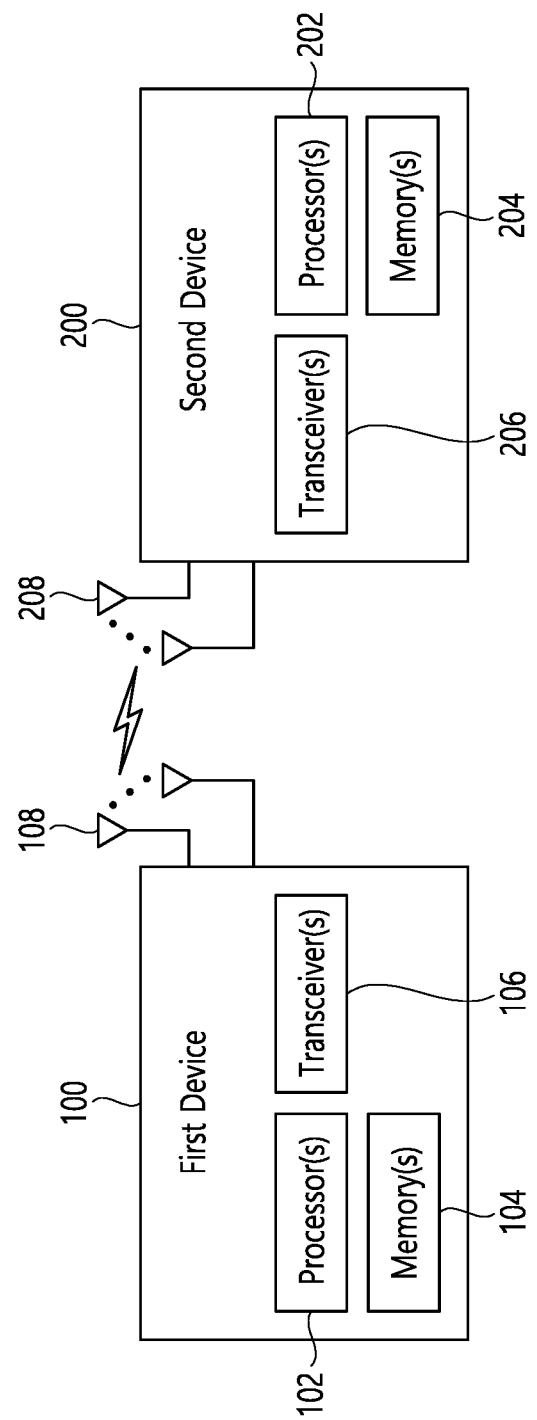
FIG. 22 shows wireless devices, in accordance with an embodiment of the present disclosure.

FIG. 22 shows wireless devices, in accordance with an embodiment of the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
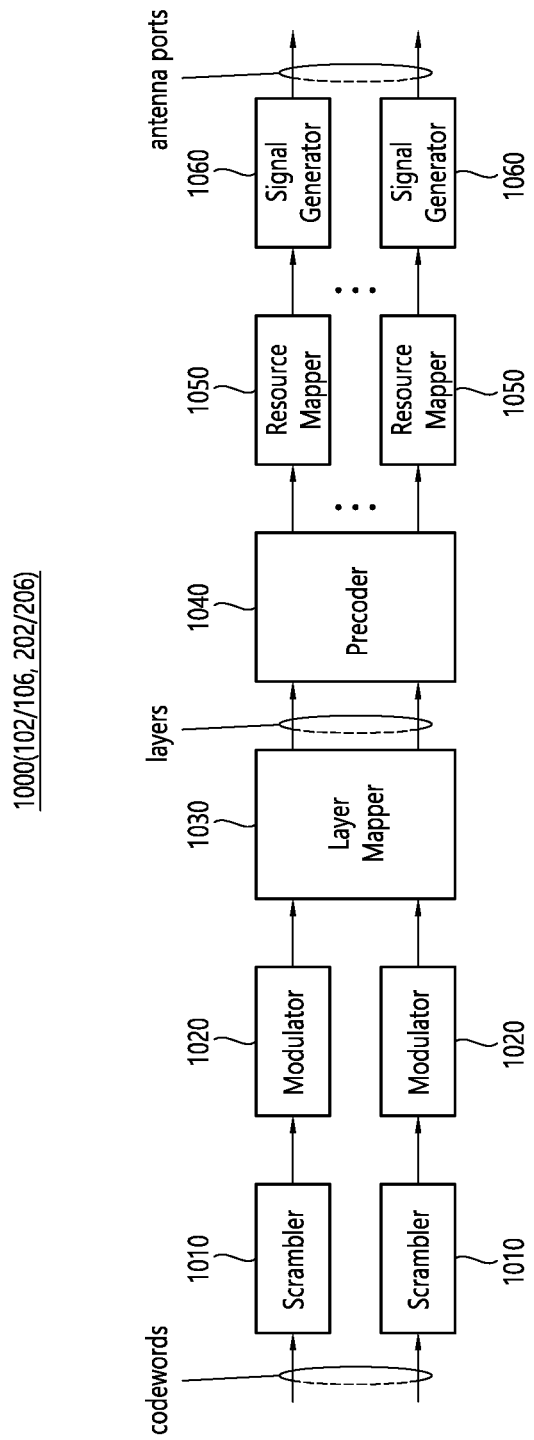
FIG. 23 shows a signal process circuit for a transmission signal, in accordance with an embodiment of the present disclosure.

FIG. 23 shows a signal process circuit for a transmission signal, in accordance with an embodiment of the present disclosure.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 23. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
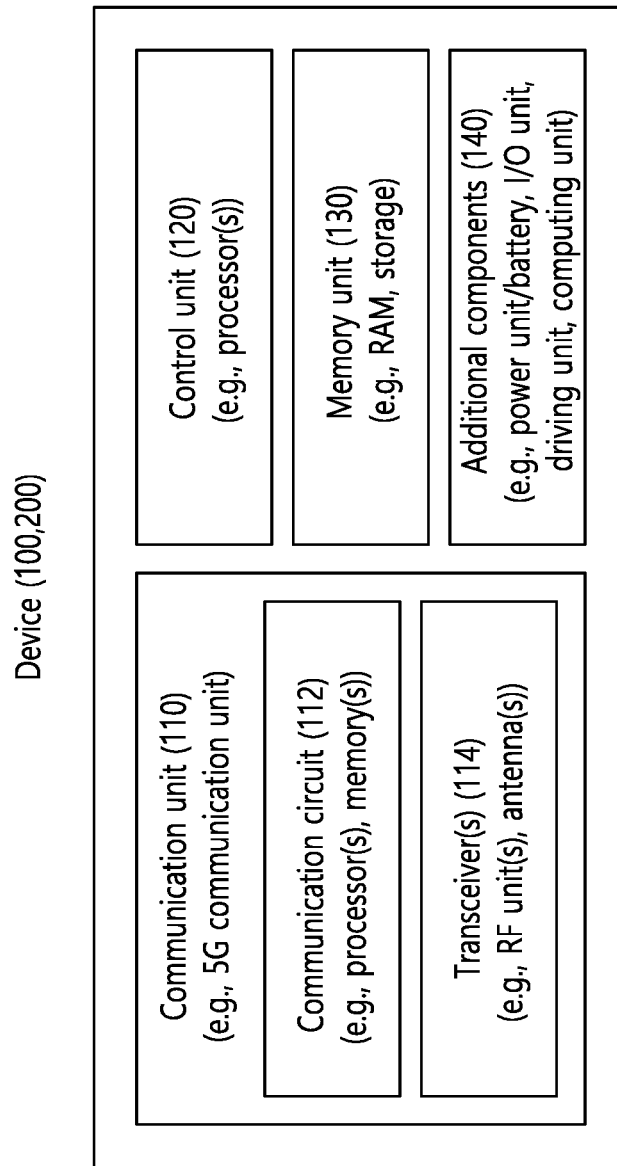
FIG. 24 shows another example of a wireless device, in accordance with an embodiment of the present disclosure.

FIG. 24 shows another example of a wireless device, in accordance with an embodiment of the present disclosure. The wireless device may be implemented in various forms according to a use-case/service (refer to FIG. 21).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
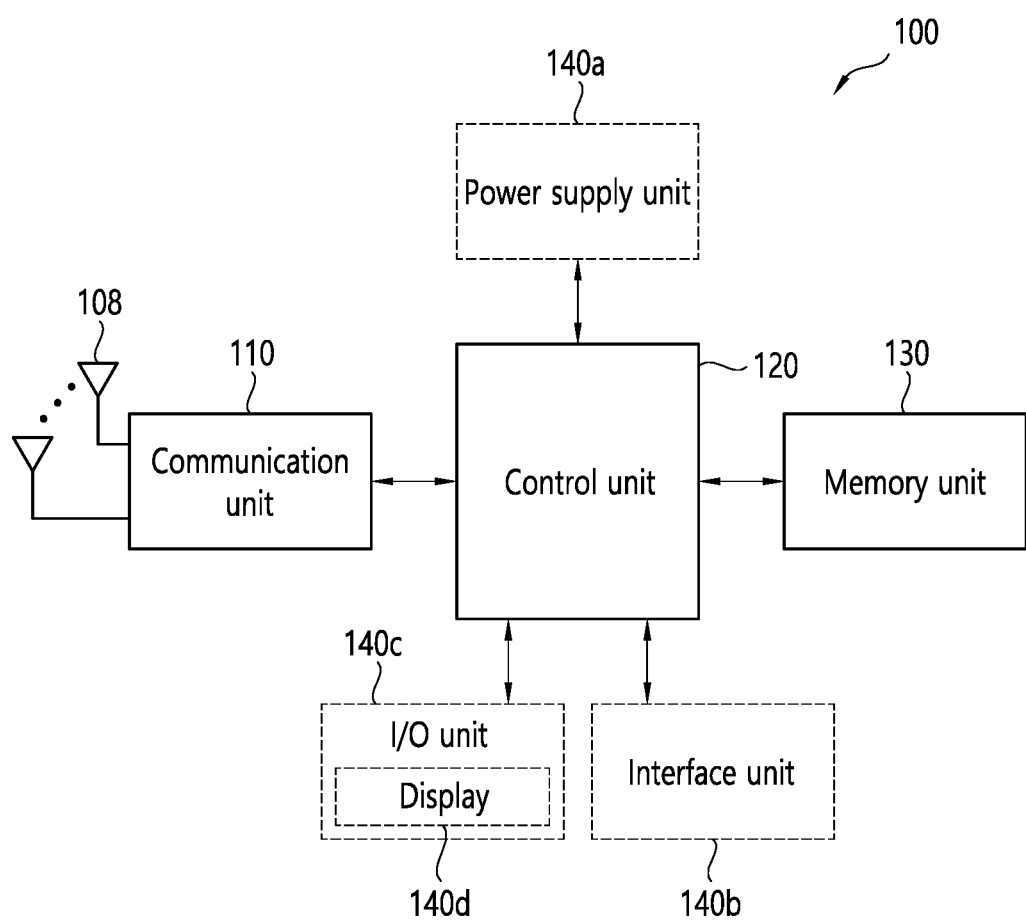
FIG. 25 shows a hand-held device, in accordance with an embodiment of the present disclosure.

FIG. 25 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 26:
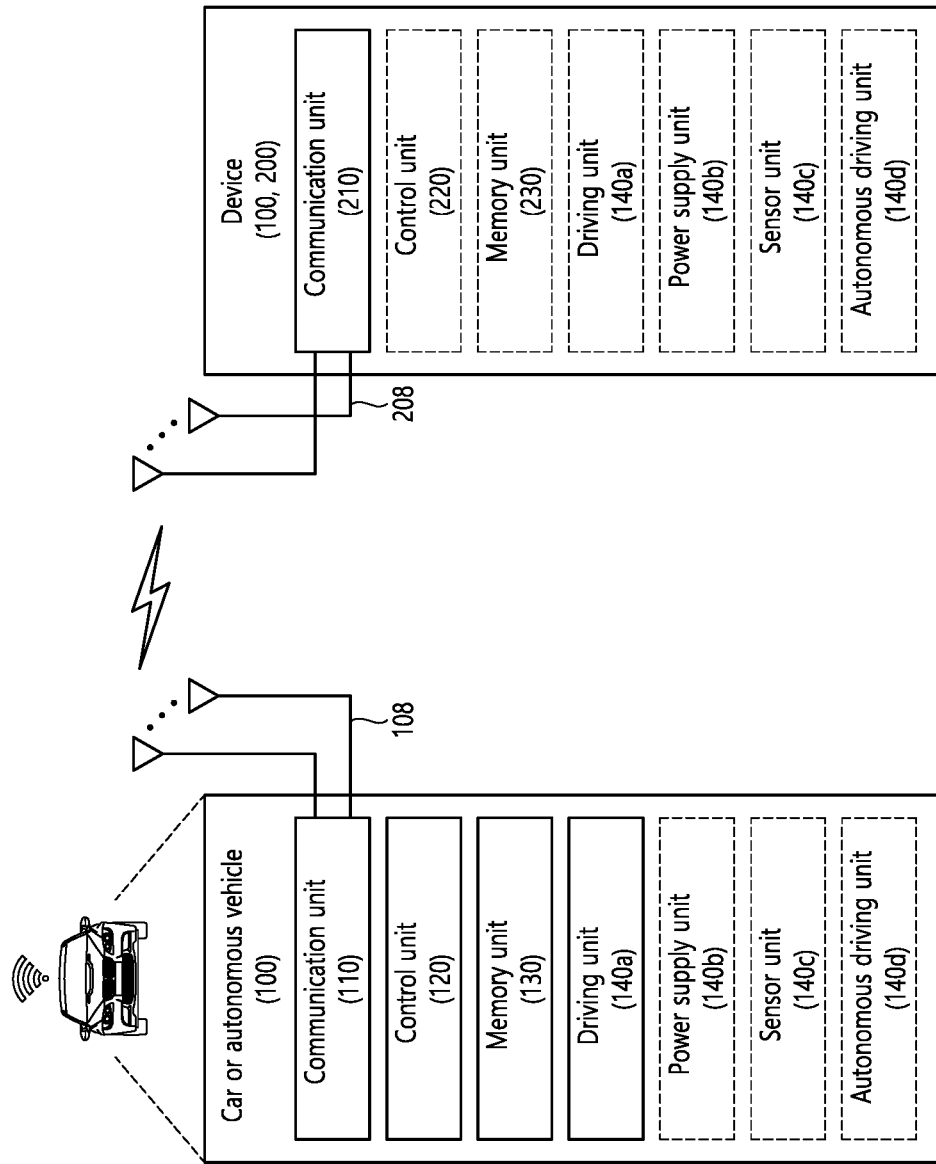
FIG. 26 shows a vehicle or an autonomous vehicle, in accordance with an embodiment of the present disclosure.

FIG. 26 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 26, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    establishing a first session for communication with a second device;
    establishing a second session for communication with a third device;
    transmitting, to a base station, assistance information related to the communication with the second device,
    wherein based on a size of data to be transmitted on the first session being greater than a size of data to be transmitted on the second session, the assistance information includes (i) information regarding a buffer status report (BSR) related to the size of data to be transmitted on the first session and (ii) information regarding preferred resources on the first session related to the BSR;
    receiving, from the base station, information regarding a resource related to the communication with the second device; and
    performing the communication with the second device by using the resource related to the communication with the second device,
    wherein the resource related to the communication with the second device is determined, by the base station, among the preferred resources on the first session related to the BSR.

2. The method of claim 1, wherein the assistance information further includes an identifier of the second device.

3. The method of claim 1, wherein the assistance information further includes an identifier of a serving cell to which the second device belongs.

4. The method of claim 1, wherein the assistance information further includes information regarding the first session.

5. The method of claim 1, further comprising:
    receiving, from the second device, information related to resources preferred by the second device on the first session,
    wherein the assistance information further includes the information related to the resources preferred by the second device on the first session.

6. The method of claim 1, wherein the assistance information further includes information regarding quality of service (QOS) related to the first session.

7. The method of claim 1, further comprising:
    transmitting, to the base station, information related to an identifier of the first device.

8. The method of claim 7, wherein the information related to the identifier of the first device includes at least one of a source ID related to the first device, a radio network temporary identifier (RNTI) related to the first device or a local ID related to the first device.

9. The method of claim 7, wherein the assistance information is transmitted to the base station based on the information related to the identifier of the first device being updated.

10. The method of claim 1, wherein the information regarding the resource related to the communication with the second device is received based on radio resource control (RRC) signaling.

11. A first device adapted to perform wireless communication, the first device comprising:
    at least one transceiver;
    at least one processor; and
    at least one memory connected to the at least one processor and storing instructions that, based on being executed, cause the at least one processor to perform operations comprising:
    establishing a first session for communication with a second device;
    establishing a second session for communication with a third device;
    transmitting, to a base station, assistance information related to the communication with the second device,
    wherein based on a size of data to be transmitted on the first session being greater than a size of data to be transmitted on the second session, the assistance information includes (i) information regarding a buffer status report (BSR) related to the size of data to be transmitted on the first session and (ii) information regarding preferred resources on the first session related to the BSR;
    receiving, from the base station, information regarding a resource related to the communication with the second device; and
    performing the communication with the second device by using the resource related to the communication with the second device,
    wherein the resource related to the communication with the second device is determined, by the base station, among the preferred resources on the first session related to the BSR.

12. A processing device adapted to control a first device to perform wireless communication, the processing device comprising:
    at least one processor; and
    at least one memory connected to the at least one processor and storing instructions that, based on being executed, cause the at least one processor to perform operations comprising:
    establishing a first session for communication with a second device;
    establishing a second session for communication with a third device;
    transmitting, to a base station, assistance information related to the communication with the second device,
    wherein based on a size of data to be transmitted on the first session being greater than a size of data to be transmitted on the second session, the assistance information includes (i) information regarding a buffer status report (BSR) related to the size of data to be transmitted on the first session and (ii) information regarding preferred resources on the first session related to the BSR;
    receiving, from the base station, information regarding a resource related to the communication with the second device; and
    performing the communication with the second device by using the resource related to the communication with the second device,
    wherein the resource related to the communication with the second device is determined, by the base station, among the preferred resources on the first session related to the BSR.

* * * * *